US011317723B2

(12) United States Patent
Bishop et al.

(10) Patent No.: US 11,317,723 B2
(45) Date of Patent: May 3, 2022

(54) UNDER-SEAT ENCLOSURE

(71) Applicant: LeisureEase, LLC, Cape Girardeau, MO (US)

(72) Inventors: Lisa Beaty Bishop, Cape Girardeau, MO (US); Carla Beaty Collette, Shady Shores, TX (US)

(73) Assignee: LeisureEase, LLC, Cape Girardeau, MO (US)

( * ) Notice: Subject to any disclaimer, the term of this patent is extended or adjusted under 35 U.S.C. 154(b) by 0 days.

(21) Appl. No.: 17/077,636

(22) Filed: Oct. 22, 2020

(65) Prior Publication Data

US 2021/0120960 A1 Apr. 29, 2021

Related U.S. Application Data

(60) Provisional application No. 62/925,439, filed on Oct. 24, 2019, provisional application No. 63/100,826, filed on Apr. 2, 2020.

(51) Int. Cl.
| | |
|---|---|
| *A47C 7/62* | (2006.01) |
| *A01K 1/03* | (2006.01) |
| *A47C 4/28* | (2006.01) |
| *A47C 4/30* | (2006.01) |
| *A47C 1/14* | (2006.01) |

(Continued)

(52) U.S. Cl.
CPC ............... *A47C 7/626* (2018.08); *A01K 1/03* (2013.01); *A01K 1/033* (2013.01); *A01K 1/034* (2013.01); *A47C 1/14* (2013.01); *A47C 4/045* (2013.01); *A47C 4/283* (2013.01); *A47C 4/30* (2013.01); *A01K 1/0035* (2013.01); *A01K 1/0254* (2013.01)

(58) Field of Classification Search
USPC ............ 297/42, 45, 188.02, 188.12, 188.13, 297/188.2; 119/474, 452, 482, 491, 496, 119/498, 499; 220/9.2; 135/157
See application file for complete search history.

(56) References Cited

U.S. PATENT DOCUMENTS

| | | | | |
|---|---|---|---|---|
| 2,570,446 A | * | 10/1951 | Hoffman ................ | A47D 9/005 5/98.3 |
| 2,574,563 A | * | 11/1951 | Hieb ..................... | D06F 95/004 220/9.3 |

(Continued)

FOREIGN PATENT DOCUMENTS

| | | | | |
|---|---|---|---|---|
| FR | 2476461 A3 | * | 8/1981 | ........... A01K 1/0254 |
| WO | WO-03105575 A2 | * | 12/2003 | ........... A01K 1/0035 |

OTHER PUBLICATIONS

The PCT Search Report and Written Opinion dated Jan. 25, 2021, for PCT Application No. PCT/US2020/057150, 14 pages.

*Primary Examiner* — Robert Canfield
(74) *Attorney, Agent, or Firm* — Shook, Hardy & Bacon L.L.P.

(57) ABSTRACT

An enclosure may be positioned underneath a chair seat to at least partially enclose the under-seat space and may open and close in conjunction with the expanding and collapsing of the chair. In one aspect, the under-seat enclosure is usable with side-to-side folding chairs (e.g., director-style folding chairs), with or without a footrest. Among other things, the under-seat enclosure may include accessory pockets and panels. In addition, the under-seat enclosure may optionally include dividers that sub-divide an interior compartment into multiple compartments.

18 Claims, 22 Drawing Sheets

(51) Int. Cl.
*A47C 4/04* (2006.01)
*A01K 1/02* (2006.01)
*A01K 1/00* (2006.01)

(56) References Cited

U.S. PATENT DOCUMENTS

| | | | | |
|---|---|---|---|---|
| 2,638,399 A * | 5/1953 | Seymour | D06F 95/004 | 312/297 |
| 2,847,017 A * | 8/1958 | Drago | E04H 15/64 | 135/157 |
| 3,286,752 A * | 11/1966 | Duryee, Jr. | B62B 3/02 | 220/9.3 |
| 3,730,294 A * | 5/1973 | Thurmond | A01M 31/02 | 182/20 |
| 4,077,418 A * | 3/1978 | Cohen | E04H 15/48 | 135/118 |
| 4,945,584 A * | 8/1990 | LaMantia | A47C 29/003 | 135/127 |
| 5,667,066 A * | 9/1997 | Simpson | B65B 67/1244 | 206/278 |
| 5,722,717 A * | 3/1998 | Rettenberger | A47C 15/004 | 297/188.1 |
| 5,873,624 A * | 2/1999 | Simpson | A47C 7/70 | 297/45 |
| 5,931,120 A * | 8/1999 | Burns | A01K 1/0254 | 119/497 |
| 6,000,752 A * | 12/1999 | Shyr | A47C 15/004 | 297/188.08 |
| 6,375,258 B1 * | 4/2002 | Fang | A47C 9/10 | 224/155 |
| D512,799 S * | 12/2005 | Simpson | D30/108 | |
| 7,080,653 B2 * | 7/2006 | Zheng | B60J 1/2091 | 135/126 |
| 7,228,820 B1 * | 6/2007 | Kellogg | A01K 1/03 | 119/498 |
| 7,628,119 B2 * | 12/2009 | Beaty Bishop | A01K 1/033 | 119/474 |
| 7,789,044 B2 * | 9/2010 | McGrade | A01K 1/0254 | 119/496 |
| 9,485,957 B2 | 11/2016 | Kellogg | | |
| 9,596,826 B2 * | 3/2017 | Lu | A01K 1/0245 | |
| 10,323,435 B2 * | 6/2019 | Ferrara | E04H 15/64 | |
| 2003/0127058 A1 * | 7/2003 | Sletten | A01K 1/0254 | 119/496 |
| 2003/0127059 A1 * | 7/2003 | Smith, Jr. | A01K 1/0254 | 119/496 |
| 2005/0103279 A1 * | 5/2005 | Brewer | A01K 1/033 | 119/498 |
| 2005/0200168 A1 * | 9/2005 | Ho | A47C 4/24 | 297/183.5 |
| 2006/0150917 A1 * | 7/2006 | Morton | A01K 1/0245 | 119/498 |
| 2006/0169218 A1 * | 8/2006 | Chang | A01K 1/0254 | 119/496 |
| 2006/0201442 A1 | 9/2006 | Farmer et al. | | |
| 2007/0079548 A1 * | 4/2007 | Bakowski | A01G 13/043 | 47/31 |
| 2007/0193522 A1 * | 8/2007 | Greschler | A01K 1/0254 | 119/28.5 |
| 2008/0012399 A1 * | 1/2008 | Lin | A47C 7/62 | 297/188.08 |
| 2008/0072837 A1 * | 3/2008 | Redzisz | A01K 1/0254 | 119/474 |
| 2008/0134985 A1 * | 6/2008 | Jakubowski | A01K 1/0254 | 119/499 |
| 2009/0101075 A1 * | 4/2009 | Matlack | A01K 1/0245 | 119/497 |
| 2010/0313824 A1 * | 12/2010 | Northrop | A01K 1/0254 | 119/496 |
| 2011/0221244 A1 * | 9/2011 | Beaty Bishop | A47C 4/52 | 297/188.08 |
| 2016/0057969 A1 * | 3/2016 | Kellogg | A01K 1/034 | 119/474 |
| 2019/0335704 A1 * | 11/2019 | Burkhart | A01K 1/03 | |

* cited by examiner

UNDER-SEAT ENCLOSURE

CROSS REFERENCE TO RELATED APPLICATIONS

This application claims priority to U.S. Provisional Application No. 62/925,439 (filed Oct. 24, 2019) and to U.S. Provisional Application No. 63/100,826 (filed Apr. 2, 2020). Each of U.S. Provisional Application Nos. 62/925,439 and 63/100,826 is incorporated herein by reference in its entirety.

TECHNICAL FIELD

This disclosure relates to an enclosure (e.g., for storage or containment of items, pets, etc.) that is positionable beneath a chair seat.

BACKGROUND

Some studies report that approximately 144 million people participate in over 11 billion outdoor leisure and recreation activities each year—outdoor events, gatherings and activities are an important part of people's lives. One item people regularly take with them to these activities is a portable folding chair for seating. There are many different styles of personal folding chairs with collapsible metal frames, canvas back, seat and arms. One can visualize a family, especially parents, spending a weekend at ballfields or parks utilizing folding chairs. These chairs are also commonly used when camping, vacationing in recreational vehicles (e.g., "RVing"), and participating at competitions of all kinds such as soccer tournaments, cross country and even the very popular and growing, dog sporting events.

In addition to folding chairs, people often take with them an array of gear (e.g., balls, coolers, etc.), supplies (e.g., suntan lotion, first aid, etc.), refreshments (e.g., drinks, snacks and more), personal valuables (e.g., phones and other electronic devices), and increasingly these days—pets. All these items can be difficult to keep track of and overwhelming to manage. Many times, all this "stuff" stays wherever it's set, such as strewn on, around, and underneath the chair in tangled heaps perilously underfoot. This lack of organization and/or storage can lead to possible trip hazards, easy targets for theft, pet discomfort and anxiety, damages, losses, and soiled conditions (e.g., dirty, wet, etc.).

In the case of pets, some studies report that 85% of dog owners consider their dogs members of their family and include them in daily family activities such as taking their pets with them to outside events and gatherings. These pet owners enjoy several benefits from this practice, including but not limited to, companionship, entertainment, and avoiding the costs of leaving the pet at home (i.e. property destruction by the pet or hiring someone to take care of the pet). Furthermore, pets also benefit from the opportunities to interact with their owners and other people and to get enrichment and exercise at different venues.

However, at many events or locations, it is inappropriate for a pet owner to permit pets to run walk or play freely without some type of restraint. Not utilizing some type of restrictive apparatus increases the risk of injury to the pet and to other attendees. For example, if not restrained a pet may be trampled or harassed by others or may not interact well with other attendees. This can raise problems for the pet owner who wishes to take his or her pet, but also wishes to remain seated and relaxed in his or her chair.

Conventional enclosures (e.g., for containing a pet or other items) may include free-standing structures that are positioned separately from a chair. Several drawbacks may arise from relying on a separate free-standing structure, regardless of whether the containment apparatus is constructed of completely rigid materials or constructed of rigid and "soft" materials or is constructed in its entirety of "soft" materials. For example, a free-standing structure requires a pet owner to carry additional, bulky items to his or her destination. In addition, at crowded events, there may not be room to accommodate or set up additional free-standing enclosures. This can be especially difficult where a pet owner is not only managing his or her pet but other items as well. Furthermore, when not in use, a free-standing structure may occupy space in a garage, closet, or other storage area.

Other conventional enclosures (e.g., for containing a pet or other items) may be usable in combination with only limited styles of folding chairs. However, the structure of these enclosures may be more suitable for only some types of chairs (e.g., quad style) and less suitable for others (e.g., director style). For example, these conventional enclosures may impede the collapsing function of some styles of chairs and/or require more complicated attachment and detachment between uses.

SUMMARY OF DISCLOSED SUBJECT MATTER

The present disclosure is directed to an under-seat enclosure. In accordance with an aspect, the under-seat enclosure includes an apparatus that may be positioned underneath a chair seat to at least partially enclose the under-seat space and that may operably open and close in conjunction with the expanding and collapsing of the chair. In one aspect, the under-seat enclosure is usable with side-to-side folding chairs (e.g., director-style folding chairs), with or without a footrest. Among other things, the under-seat enclosure may include accessory pockets and panels. In addition, the under-seat enclosure may optionally include dividers that subdivide an interior compartment into multiple compartments.

BRIEF DESCRIPTION OF THE DRAWINGS

Additional aspects of the present disclosure directed to an under-seat enclosure are described in detail below with reference to the attached drawing figures, which are incorporated herein by reference and are briefly described directly below.

DETAILED DESCRIPTION

Figure 1:
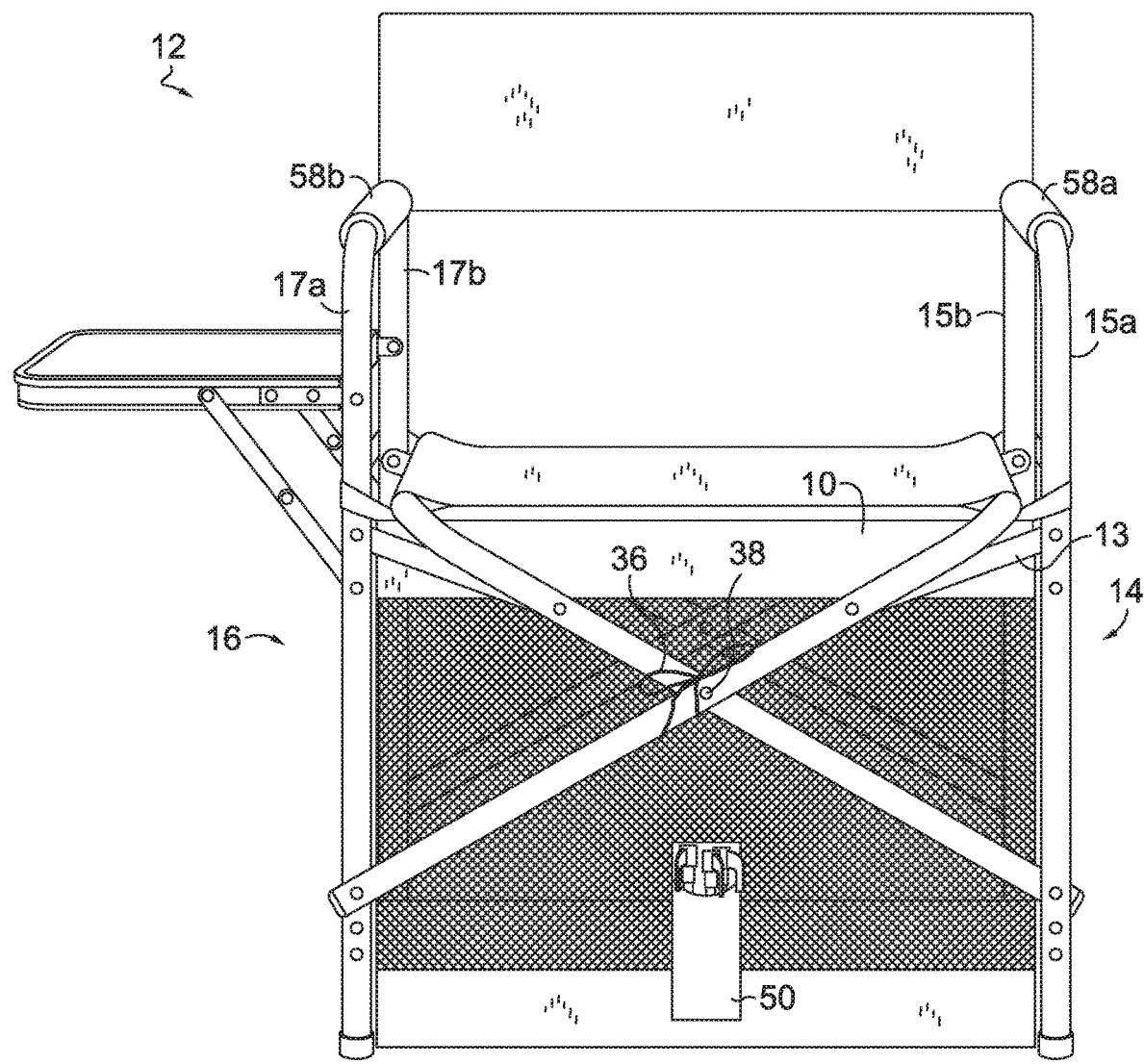
FIG. 1 depicts an under-seat enclosure in combination with a folding chair, in accordance with an aspect of the present disclosure.

Subject matter is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

The subject matter described in this specification generally relates to, among other things, an under-seat enclosure. In some aspects, the under-seat enclosure is usable with side-to-side folding chairs, commonly referred to as director's chairs, but also referred to as captain's chairs, lawn chairs, and fishing chairs—the naming convention often depending on the target market (e.g., outdoor, home goods, etc.). The apparatus, which includes a box-like storage compartment (e.g., rectangular shaped) that is releasably attachable beneath the chair's seat and within its framework, expands concomitantly with the chair when the chair is opened for use, substantially filling and enclosing the space to form a fully-enclosed storage/pet enclosure.

An under-seat enclosure may include various elements. For example, in one aspect, the under-seat enclosure attaches to the chair in such a way as to not impede opening or collapsing of the chair. In addition, the under-seat enclosure folds entirely within the frame assembly of the chair so that the under-seat enclosure may be stored together with the chair, thereby occupying less storage space than independent enclosures and reducing the number of items that might be transported to and from events.

Furthermore, an under-seat enclosure may include various accessory pockets, pouches, sleeves, or other structures for storing items. Moreover, an under-seat enclosure may include a variety of different panel structures forming sides of the under-seat enclosure. For example, in some instances, sides of the enclosure may be entirely removable for replacement, repair, washing, etc. As such, the under-chair enclosure is customizable to selectively include ventilated panels (e.g., mesh); insulated panels (e.g., non-mesh with fill); solid panels; branded panels with signage, insignia, or other indicia; etc. In other instances, the sides of the enclosure may include a primary panel (e.g., mesh) that is more permanently affixed with the enclosure and a secondary panel (e.g., solid, non-mesh) that may be selectively added or removed for increased privacy or insulation or added branding.

Subject matter described in this disclosure may be used in combination with chairs of various sizes. For example, some side-to-side folding chairs are taller than others, and the subject matter of this disclosure is usable in combination with both shorter and taller versions of side-to-side folding chairs.

Before describing the figures in more detail, some additional explanation will now be provided related to certain terminology that may be used in this disclosure.

"A," "an," "the," "at least one," and "one or more" might be used interchangeably to indicate that at least one of the items is present. When such terminology is used, a plurality of such items might be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated materials, features, steps, operations, elements, or components, but do not preclude the presence or addition of one or more other materials, features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The phrases "formed from" and "formed of" are also intended throughout this disclosure and the accompanying claims to be inclusive, and to specify the presence of stated materials, features, steps, operations, elements, or components, but to not preclude the presence or addition of one or more other materials, features, steps, operations, elements, or components unless otherwise indicated.

For consistency and convenience, directional adjectives might be employed throughout this detailed description corresponding to the illustrated examples. Ordinary skilled artisans will recognize that terms such as "above," "below," "upward," "downward," "top," "bottom," etc., may be used descriptively relative to the figures, without representing limitations on the scope of the inventive embodiments described in this Specification, and as further defined by the claims.

The term "longitudinal," as possibly used throughout this detailed description and in the claims, refers to a direction extending along a length of a component; that is, aligned with its longest dimension, unless otherwise indicated.

The term "transverse," as possibly used throughout this detailed description and in the claims, refers to a direction extending across a width of a component. The transverse direction or axis may also be referred to as a lateral direction or axis and may be perpendicular to the longitudinal direction.

The term "vertical," as possibly used throughout this detailed description and in the claims, refers to a direction generally up/upward and down/downward. For example, in cases where an enclosure is planted flat on a ground surface, the vertical direction may extend from the ground surface upward. The term "upward" or "upwards" refers to the vertical direction pointing towards a top of the component. The term "downward" or "downwards" refers to the vertical direction pointing opposite the upwards direction, toward the bottom of a component, and may generally point towards the bottom of an enclosure.

The "interior" of an enclosure refers to portions at the space that is enclosed by the one or more walls of the enclosure and in which items, pets, etc. may be stored. The "inner side" of a component refers to the side or surface of the component that is (or will be) oriented toward the interior of an assembled enclosure (e.g., when the walls of the enclosure are assembled). The "outer side" or "exterior" of a component refers to the side or surface of the component that is (or will be) oriented away from the interior of an assembled enclosure. In some cases, other components may be between the inner side of a component and the interior in the assembled enclosure. Similarly, other components may be between an outer side of a component and the space external to the assembled enclosure. Further, the terms "inward" and "inwardly" shall refer to the direction toward the interior of the component or enclosure, and the terms "outward" and "outwardly" shall refer to the direction toward the exterior of the component or enclosure. In addition, the term "proximal" may be relative and refers to a direction that is nearer a center of an enclosure or a wall of an enclosure. Likewise, the term "distal" refers to a relative position that is further away from a center of the enclosure or wall of the enclosure. Thus, the terms proximal and distal may be understood to provide generally opposing terms to describe relative spatial positions.

As used herein the phrases "means for releasably attaching" and "means for releasable attachment" refer to any and all apparatus that enable non-permanent connection of one object to another object, such that objects may be connected and disconnected when so desired. Examples of means for releasably attaching and means for releasable attachment may include but are not limited to clips, snaps, clasps, buttons, clamps, buckles, zippers, hook and loop strips, and ties.

Figure 4:
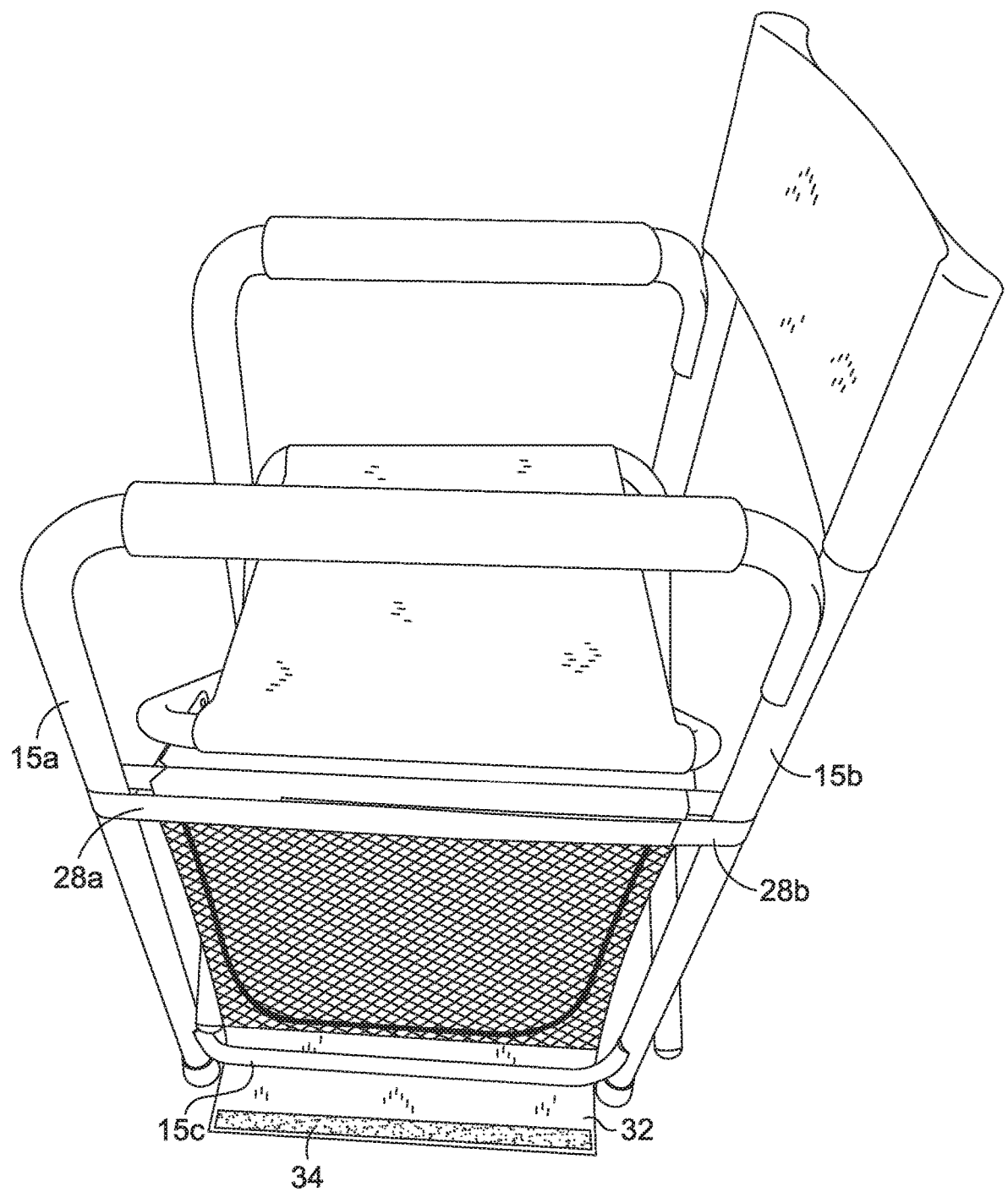
FIG. 4 depicts a side view of an under-seat enclosure attaching to a side frame of a chair by flexible members wrapping around side frame posts and attaching to one another, in accordance with an aspect of the present disclosure.

Referring now to FIG. 1, FIG. 1 depicts an under-seat enclosure 10 positioned beneath a side-to-side folding chair 12 (e.g., director's chair), and at a high level, the under-seat enclosure 10 releasably attaches to left and right side frame assemblies 14 and 16 of the chair 12. A typical side-to-side folding chair includes a left side frame assembly and a right side frame assembly that support scissor frame members of a seat assembly, and the scissor frame members pivotally open and close depending on a state of the chair. In both the open and closed positions, each of the side frame assemblies often retains a same configuration (e.g., does not necessarily collapse), although when moving from an open state to a closed state, the side frame assemblies move towards another and vice versa when opened. Note that for purposes of this disclosure, the "left" is identified as the side of the chair or enclosure that would generally correspond with a user's left side when sitting in the chair 12, and the "right" is identified as the side of the chair or enclosure that would generally correspond with a user's right side when sitting in the chair 12. In addition, each side frame assembly generally includes a front vertical support (e.g., 15a and 17a); a back vertical support (e.g., 15b and 17b); a horizontal arm support (e.g., 58a and 58b); and a horizontal bottom support rail (e.g. 15c in FIG. 4). The chair 12 is an example of one size of side-to-side folding chair, and in other aspects, the under-seat enclosure 10 may be usable with other sizes of side-to-side folding chairs, such as the taller version depicted in FIG. 17, which also includes side frame assemblies with similar components.

Figure 8:
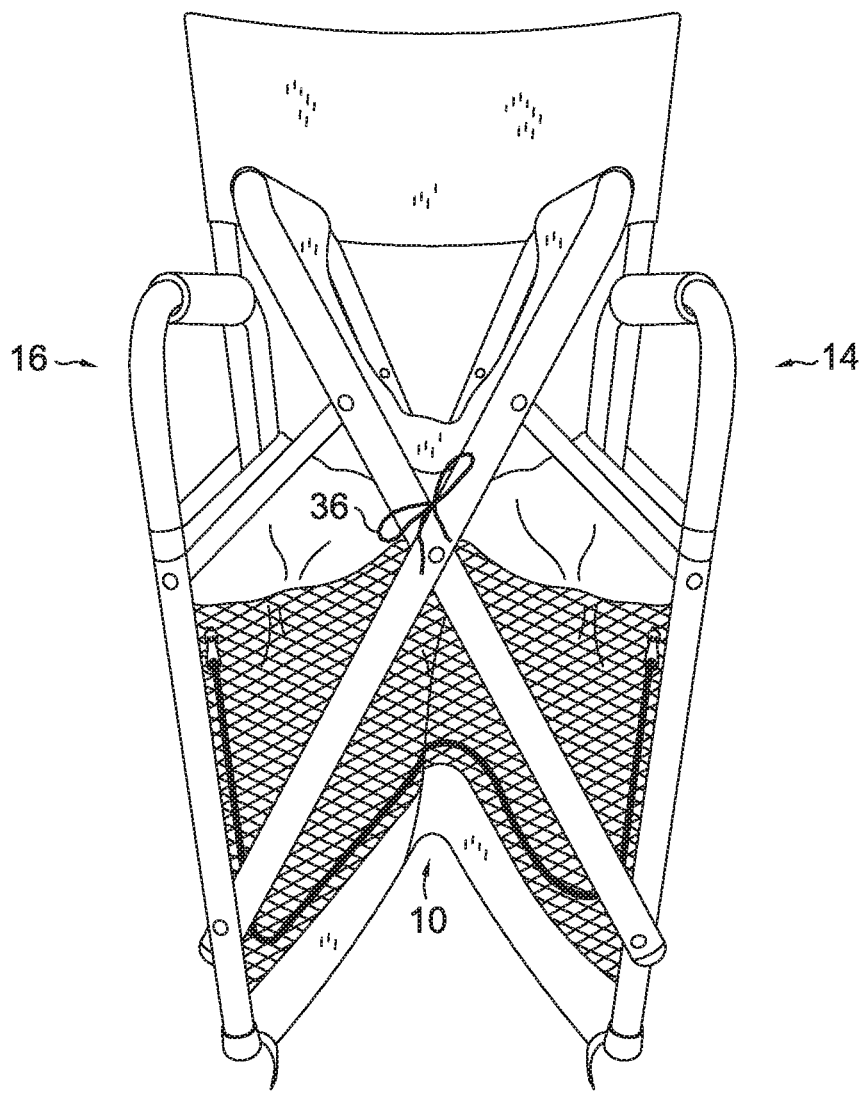
FIG. 8 depicts a partially collapsed chair with the under-seat enclosure retained within the chair frame, in accordance with an aspect of the present disclosure.

When the chair 12 is opened and setup for use, the enclosure 10 expands concomitantly with the chair 12, and fills the area beneath the seat of the chair and between the side frame assemblies to enclose space beneath the seat. The enclosed space may then be used for storage or pet containment, and attachment of the enclosure 10 to the chair 12 does not interfere with the opening or closing operations (e.g., FIG. 8) of the chair 12 or the use of the chair 12 for sitting. When the chair 12 is closed, the enclosure 10 compresses and folds within the collapsed side frame assemblies of the chair to remain with the chair when being stored (see e.g., FIG. 9).

Figure 2A:
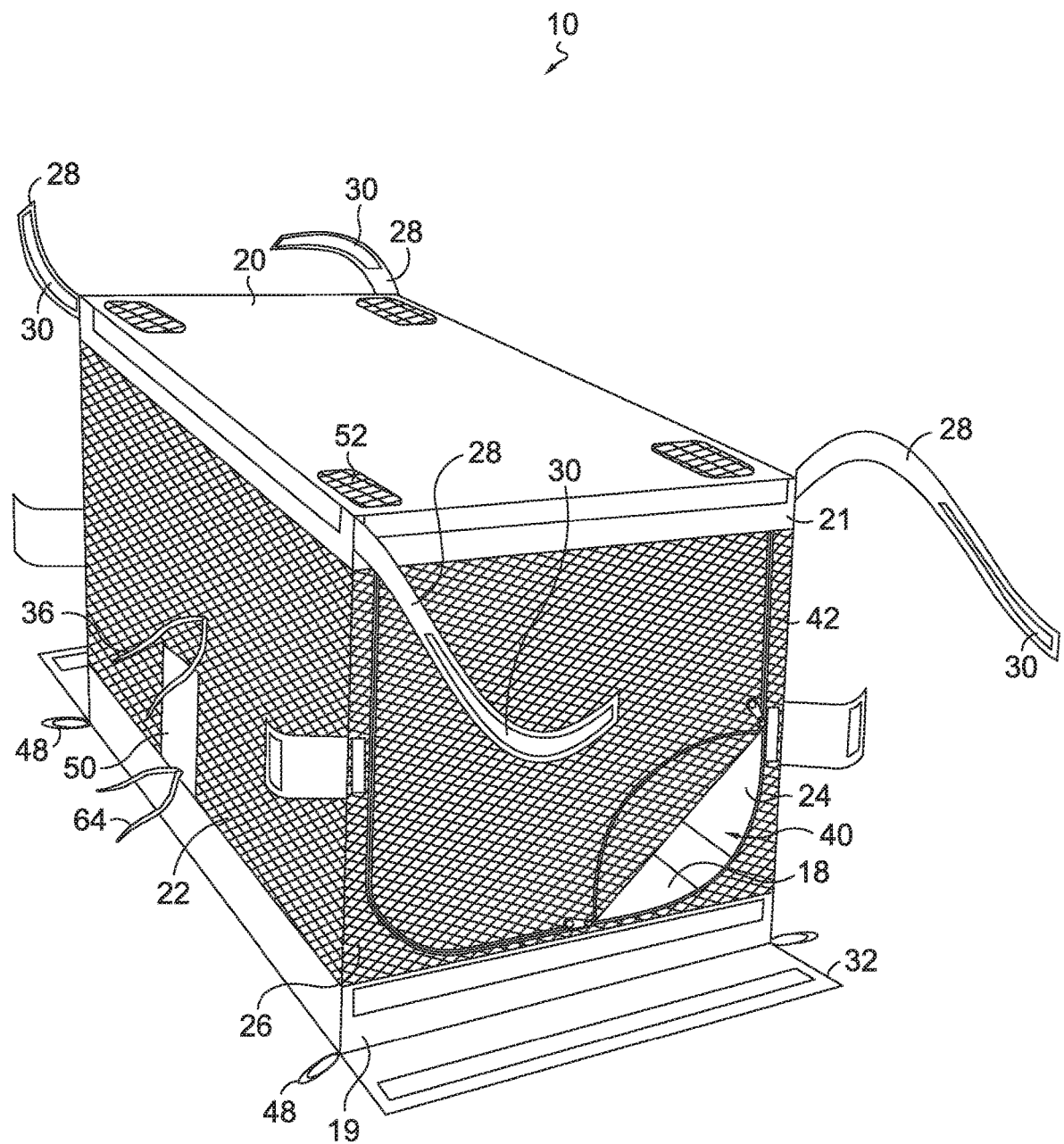
FIG. 2a depicts an under-seat enclosure independently of a chair, in accordance with an aspect of the present disclosure.

Referring now to FIG. 2a, FIG. 2a depicts the under-seat enclosure 10 independently of a chair, and in FIG. 2a a perspective of the front, left portion of the under-seat enclosure 10 is depicted. The enclosure 10 generally includes a left portion, a front portion, a right portion, a back portion, a top portion, and a bottom portion. Each portion generally corresponds with typical side in an orthogonal space describing a three-dimensional object, and each portion might be made up of one more sides, facets, walls, edges, corners, and the like, which may form part of one or more of the portions. For example, a portion might be constructed of a wall or panel that only forms a part of that portion, or alternatively, multiple portions might share a structure (e.g., wall or corner) that forms parts of the multiple portions. In one aspect, the enclosure 10 includes one or more panels that fold and/or connect to one another to form a box-like structure or container having a base, sides, top, or any combination thereof. For example, the one or more panels might include a base panel 18, a top panel 20, and side panels, such as a front panel 22, a back panel 24, and a left panel 26 (the right panel being obscured from view in FIG. 2a). The panels may form a front wall, a back wall, a left wall, a right wall, a top wall (e.g., ceiling or lid), and a bottom wall (e.g., floor or base).

The panels might attach to one another (e.g., by stitching, bonding, welding, etc.) in various manners. For example, panels may be connected to one another along overlapping portions (e.g., overlap joint) forming seams. In some instances, the overlapping portions that are joined with one another may align with the corners or edges of the enclosure 12. In other instances, the overlapping portions may be offset from the corners or edges. For example, the base panel 18 may include portions that form a bottom wall, as well as overlapping portions 19 that extend or wrap upward from the bottom wall and overlap with the sides (e.g., left side, right side, front, back, or any combination thereof). Similarly, the top panel 20 may include portions that form a ceiling or lid, as well as overlapping portions 21 that extend or wrap downwards to overlap with the sides (e.g., left side, right side, front, back, or any combination thereof). In some instances, these overlapping portions 19 and 21 may include a non-mesh material that provides a location for the attachment of other elements, such as webbing, hook-and-loop, or other releasable connectors. In an aspect of the disclosure, when the panels are attached to one another an enclosure is formed. The illustrated enclosure 10 is a 6-sided, rectangular prism, and in other aspects, the enclosure may have a different number of sides (e.g., fewer than six or more than six) and/or a different shape (e.g., triangular, pentagonal, etc.).

Figure 3:
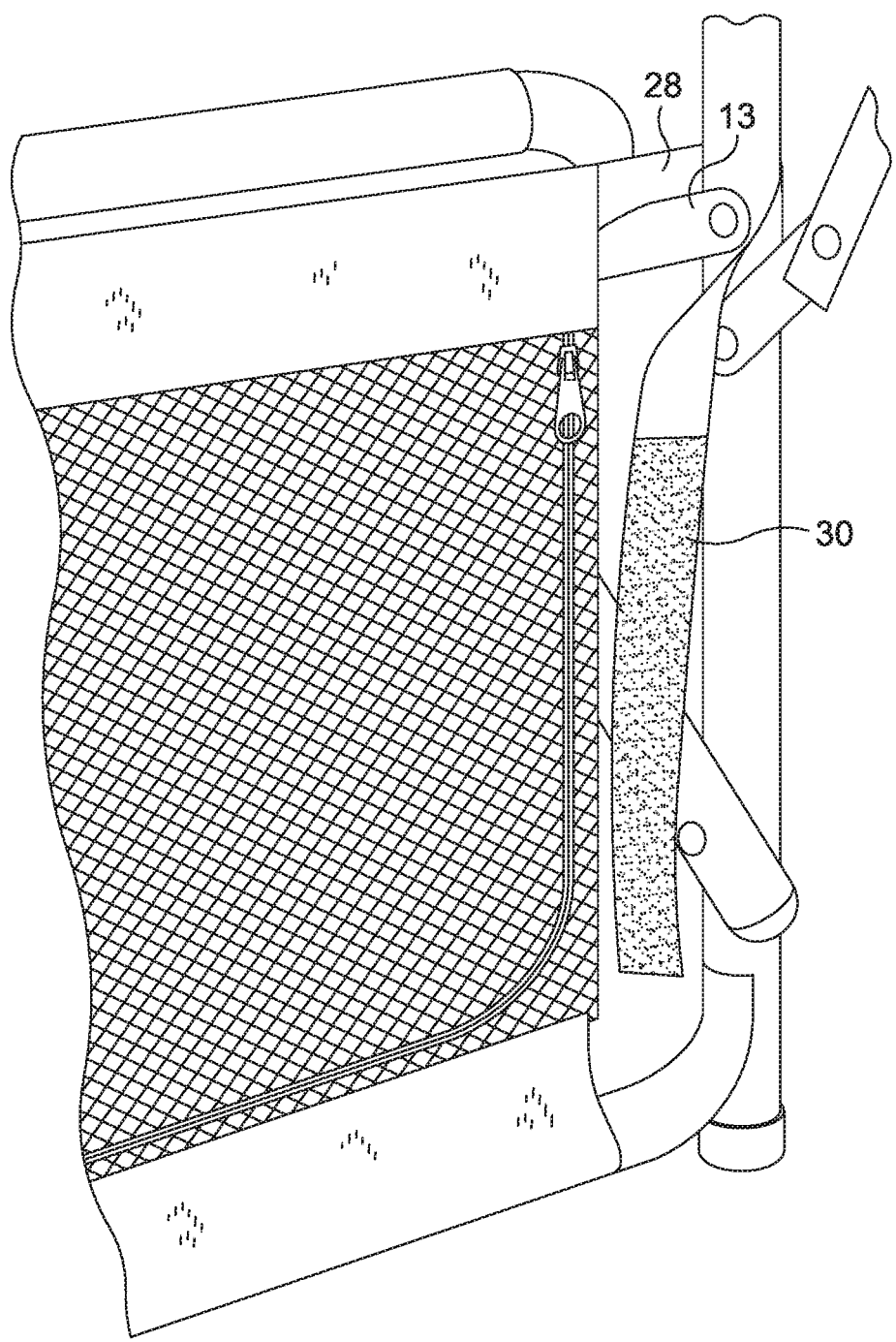
FIG. 3 depicts a side view of an under-seat enclosure attaching to a side frame of a chair by a flexible member wrapping above a pivot link, in accordance with an aspect of the present disclosure.

In a further aspect, the enclosure 10 includes components that releasably attach to the left and right side frame assemblies 14 and 16 of the chair 12. The enclosure 10 may attach to the vertical supports, the arm support, the bottom rail support, or any combination thereof. For example, in FIG. 2a the apparatus includes elongated flexible members 28 (e.g., elongated straps, cords, cables, string, elastic tape, fabric tape, webbing, etc.) extending outwardly from the panels. The elongated flexible members 28 might be anchored near each corner of the top panel 20 (e.g., near a transition from the top wall to the side walls) and extend outwardly to a free end. Each elongated flexible member 28 includes a releasable connector 30 (e.g., hook-and-loop, snap, clip, tie, buckle, etc.), such that the elongated flexible member 28 may wrap around a respective vertical frame member (e.g., 15a/b and 17a/b in FIG. 1) and engage the releasable connector 30 to connect the enclosure 10 to the chair. For example, in FIG. 2a, the releasable connector 30 includes hook-and-loop strips, and in other aspects, the elongated flexible members 28 may include other releasable connectors. In some embodiments, the elongated flexible members 28 may wrap around the side assembly above the chair seat frame pivot braces 13, and an example of this is depicted at least in FIGS. 1 and 3. In other examples, the flexible members 28 may wrap around the side assembly below the pivot braces.

Figure 5:
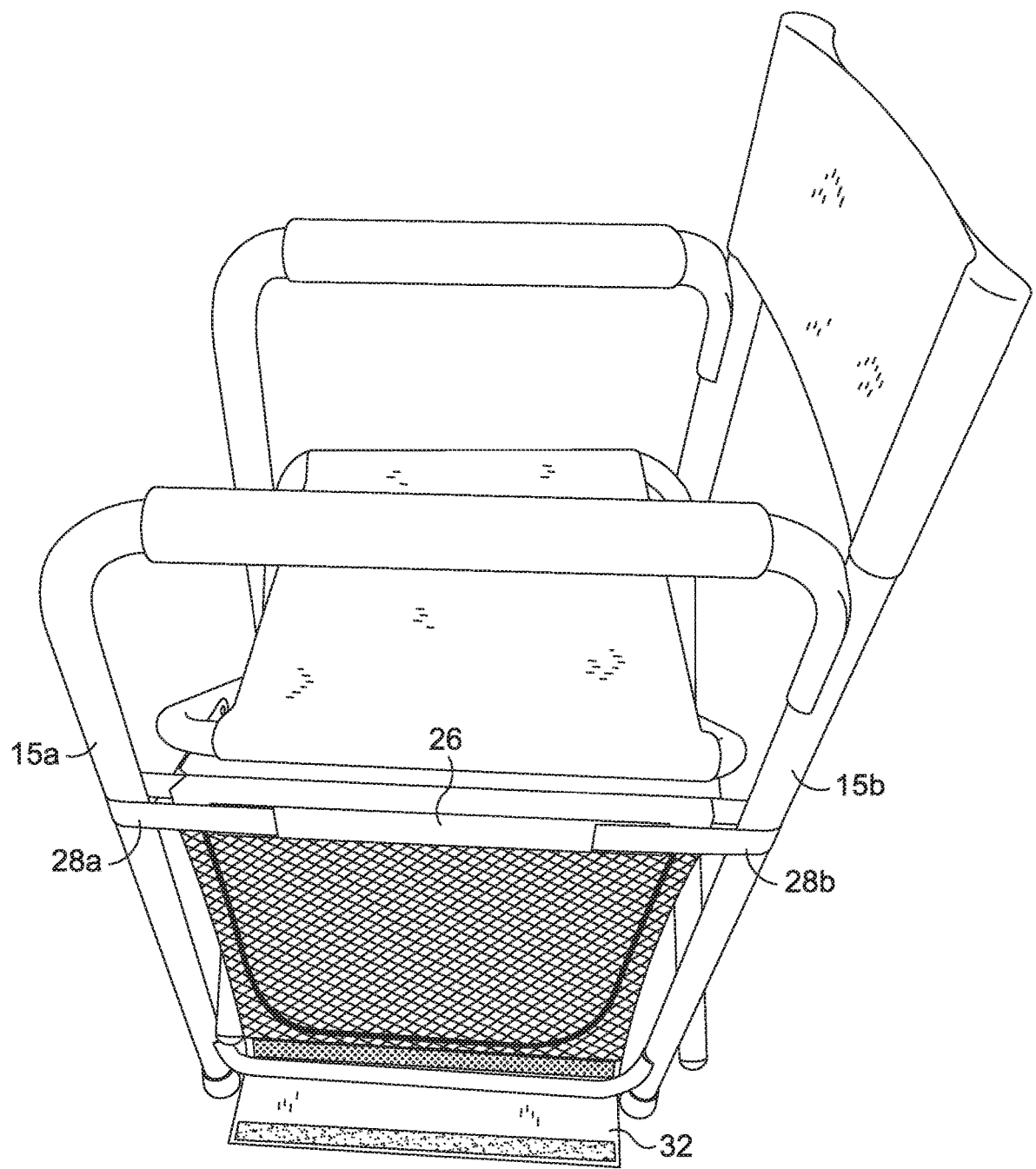
FIG. 5 depicts a side view of an under-seat enclosure attaching to a side frame of a chair by flexible members wrapping around side frame posts and attaching to a panel of the enclosure, in accordance with an aspect of the present disclosure.

In one embodiment, the elongated flexible members 28 include a front elongated flexible member on each side and a back elongated flexible member on each side that wrap around respective vertical frame members. For example, on the left side FIGS. 4 and 5 each depicts a front elongated flexible member 28a and a back elongated flexible member 28b and depicts a front vertical frame member 15a and a back vertical frame member 15b. In one aspect depicted in FIG. 4, the front and back elongated flexible members 28a and 28b may each wrap around a respective vertical frame member and releasably attach to one another. Alternatively, as depicted in FIG. 5, the elongated flexible members 28a and 28b may each encircle a respective vertical frame member and releasably attach to one or more panels (e.g. to the side panel 26 or the top panel). For example, the elongated flexible members 28a and 28b may attach to a mating component (e.g., mating portion of hook-and-loop) on the overlapping portion 21.

Figure 2B:
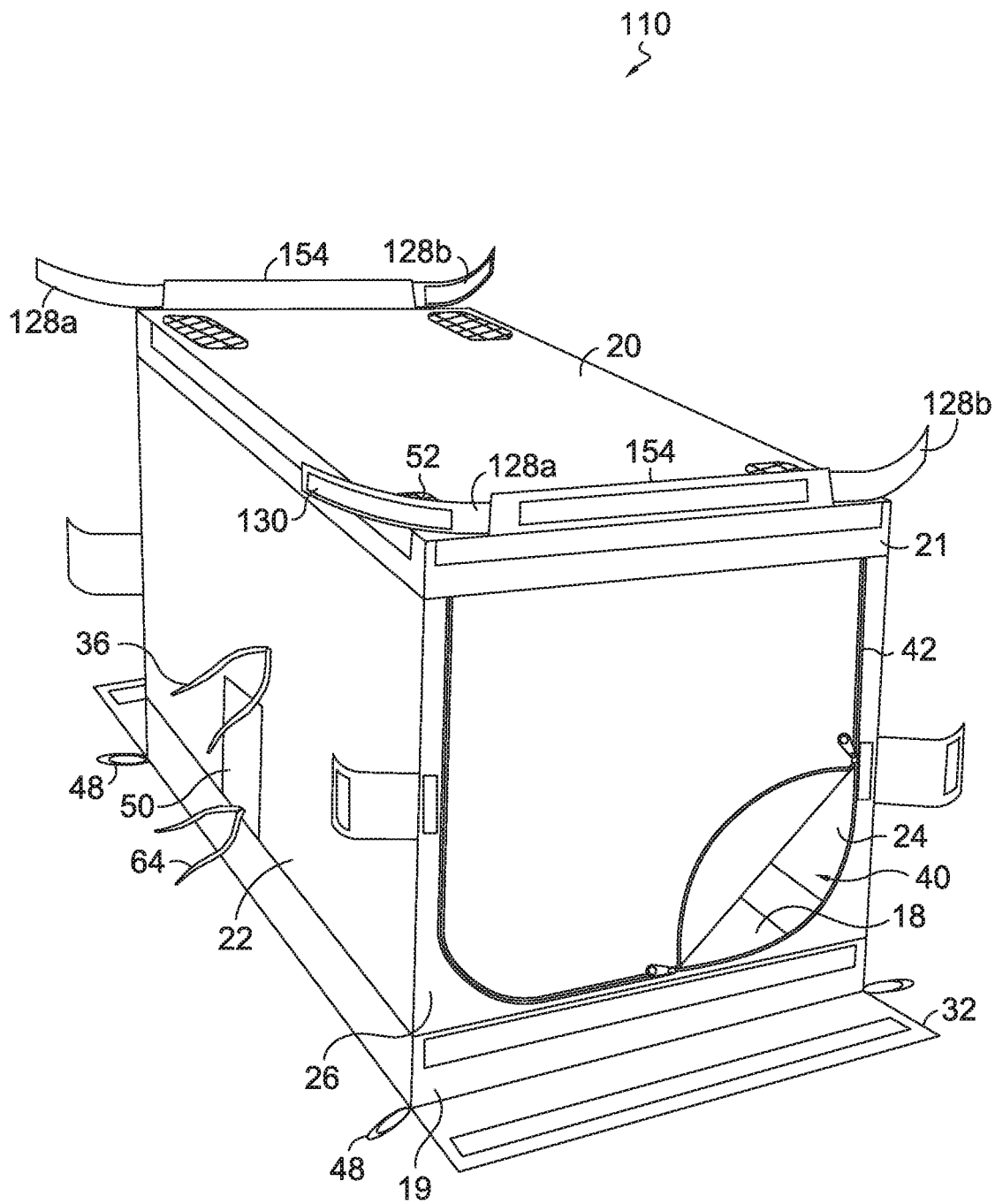
FIG. 2b depicts an under-seat enclosure that is similar to the under-chair enclosure shown in FIG. 2a, except the under-seat enclosure in FIG. 2b includes upper flexible extensions 154 with elongated flexible members 128a and 128b.

In FIG. 2a, the elongated flexible members 28 are anchored directly to one of the sides and/or directly to the top. In another aspect, the elongated flexible members may be anchored to other structures. Referring to FIG. 2b, FIG. 2b depicts another aspect of the present disclosure, including an enclosure 110, in which elongated flexible members 128a and 128b are anchored to upper flexible extensions 154.

In FIG. 2b each of the left portion and the right portion of the enclosure 110 include a flexible extension 154 anchored near the transition between the side portion and the top portion. The flexible extension 154 extends generally outward and upward from near the transition and extends from the front portion of the enclosure to the back portion of the enclosure. In one aspect, when installed on a chair, each flexible extension 154 extends away from the enclosure 110 in a generally upward orientation and generally parallel with the side frame assembly of the chair. In addition, each flexible extension 154 includes a front elongated flexible member 128a and a back elongated flexible member 128b, which may attach to the vertical frame members in a manner similar to the elongated flexible members 28a and 28b. For example, in one aspect, the front and back elongated flexible members 128a and 128b may each wrap around a respective vertical frame member and releasably attach to one another (e.g., using the releasable connectors 130). Alternatively, the elongated flexible members 128a and 128b may each encircle a respective vertical frame member and releasably attach to the flexible extension 154. For example, the elongated flexible members 128a and 128b may attach to a mating component (e.g., mating portion of hook-and-loop) on the flexible extension 154.

In an aspect of the enclosure, the elongated flexible members 128a and 128b may attach to the vertical frame members at a relatively higher location, as compared with the elongated flexible members 28a and 28b, since the flexible extensions 129 extend upward. In some instances, spacing the elongated flexible members 128a and 128b away from the main enclosure (i.e., using the flexible extension 129) reduces the likelihood that the portion of the enclosure at the transition from the top portion to the side portion becomes crumpled when the enclosure is affixed to the chair. In addition, using the flexible extensions 129, the enclosure 110 hangs more freely under the seat without being compressed against the side frame assemblies. In one embodiment, the flexible extension 129 is a flap, panel, or wing to which the flexible extension members 128a and 128b are affixed. In another embodiment, the flexible extension 129 may be a sleeve having a tubular structure through which a single flexible member extends, such that each end of the single flexible members forms either the front flexible extension member 128a or the back flexible extension member 128b.

Figure 2C:
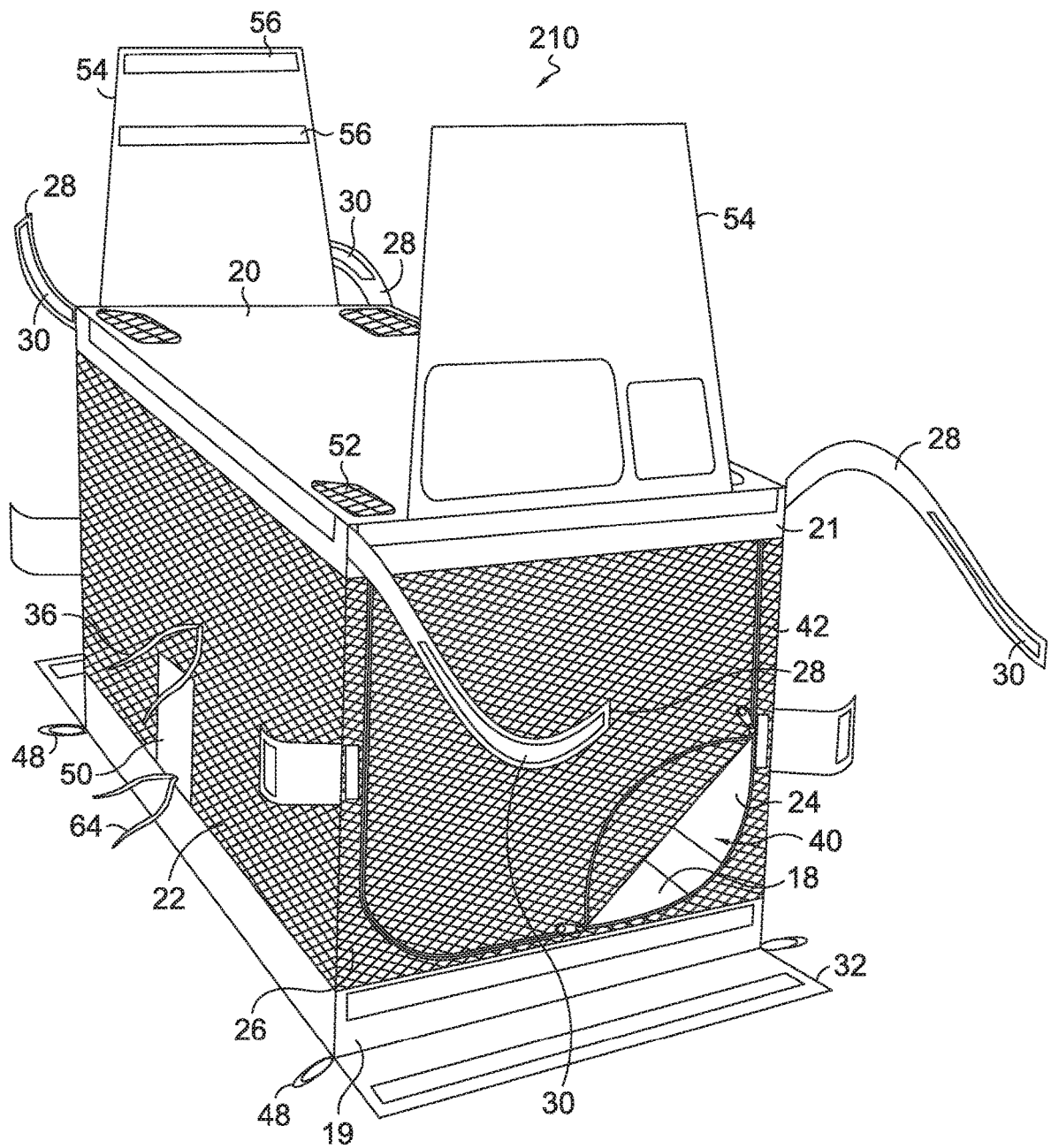
FIG. 2c depicts an under-seat enclosure that is similar to the under-chair enclosure shown in FIG. 2a, except the under-seat enclosure in FIG. 2c includes upper flexible extensions 54.
Figure 11:
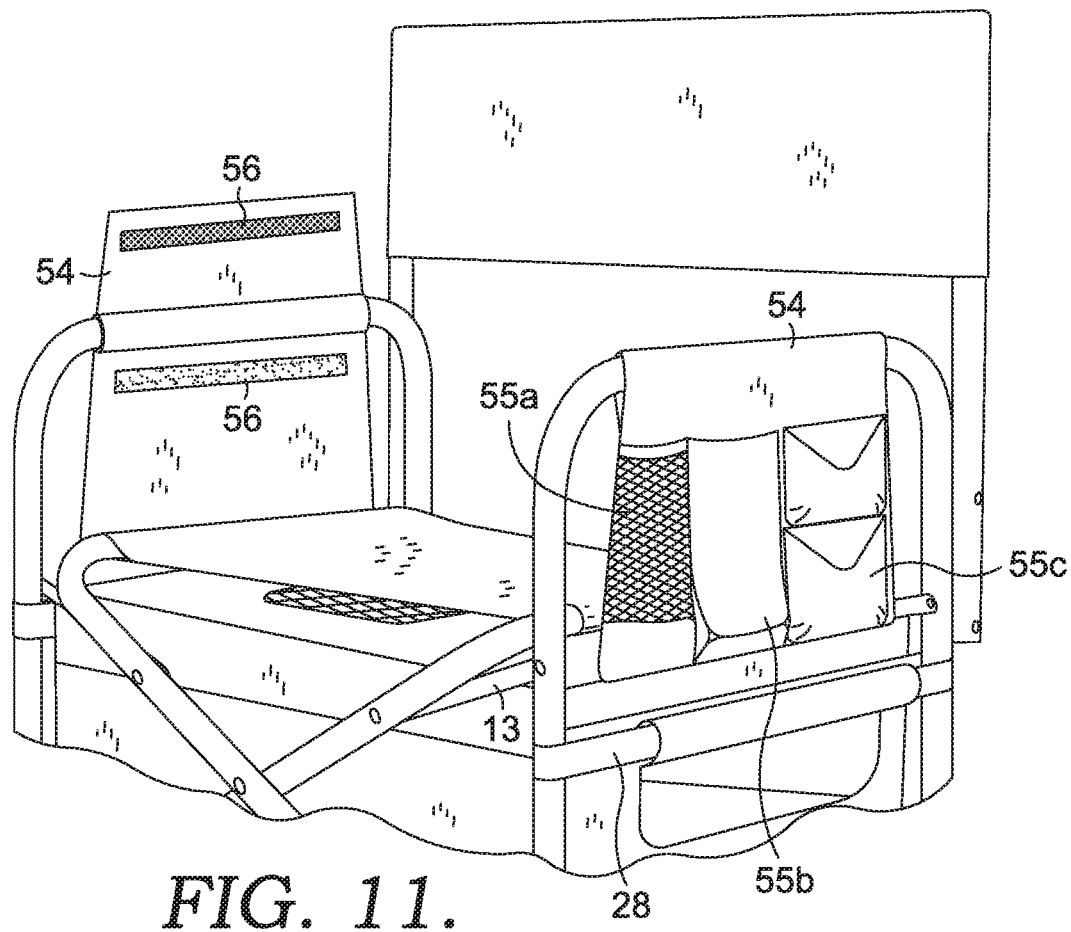
FIG. 11 depicts upper flexible extensions of an under-seat enclosure that may attach to arm supports of a chair, in accordance with an aspect of the present disclosure.

Referring to FIG. 2c, FIG. 2c depicts another alternative embodiment of the present subject matter, including the enclosure 210 having one or more upper flexible extensions 54. In FIG. 2c, the enclosure 210 includes one or more upper flexible extensions 54 positioned near the top or upper region of the enclosure 10, and each upper flexible extension 54 may extend along the side panels from the front to the back of the enclosure 210, near a transition from the side panel to the top panel. Each upper flexible extension 54 may be affixed to the enclosure 210 along one edge, such as by stitching, and extend to a free end having a releasable connection 56. In one aspect, each upper flexible extension 54 may encircle a respective chair arm 58a/58b and releasably attach back onto itself using the releasable connection 56, and an example of this attachment to the arm supports is depicted in FIG. 11. FIGS. 2c and 11 illustrate hook-and-loop strips as the releasable connection 56, and in other embodiments, the releasable connection 56 may include a tie, snap, c-clip, and the like. Among other things, this attachment of the upper flexible extensions 54 to the arms 58a and 58b may contribute to expanding and fully supporting the enclosure 210 beneath the seat of the chair 12 and between the chair side frame supports. In addition, this may permit the flexible members 28 to be affixed either below the pivot braces 13 (e.g., FIG. 11) or omitted from the enclosure 10 in some instance. In yet another embodiment, the elongated flexible members 28 may be anchored to the upper flexible extensions 54 and may operate similar to the elongated flexible extensions 128a and 128b (FIG. 2b). The upper flexible extensions 54 may include a combination of panel shapes, configurations, etc. For example, the flexible extensions 54 may be constructed of the same or similar material as the panels. In addition, the flexible extensions 54 may include accessory components 55a-c, such as a storage pocket, a storage pouch, etc. The upper flexible extensions 54 may be included with the enclosure in some embodiments (e.g., FIGS. 2a and 11) and may be omitted from the enclosure in other embodiments (e.g., FIGS. 1 and 3-6).

Except as explicitly described herein or explicitly depicted in the figures, the enclosures 10, 110, and 210 may include some similar elements, and for the sake of brevity and readability, these similar elements may be describe with respect to only one of the enclosures 10, 110, and 210, and it is understood that the other enclosure(s) may also include those similar elements.

In a further embodiment, the enclosure 10 includes one or more lower flexible extensions 32 (e.g., panel extension, wing, flap, strap(s), etc.) that extend outward from the enclosure 10 near a transition from the side(s) to the base 18. The enclosure 10 includes a lower flexible extension 32 on the left side and another lower flexible extension on the right side (obscured from view). The one or more lower flexible extensions 32 may generally extend from near the front of the enclosure to near the back, and may include a single panel or may include multiple panels or strips (e.g., webbing, straps, cords etc.). In an aspect of this disclosure, the lower flexible extension 32 may wrap around the horizontal bottom support rail (e.g., 15c in FIG. 4) of the chair's corresponding left and right side frame assemblies. As such, the lower flexible extension 32 may also be referred to as "bottom-rail connector." Once the lower flexible extension 32 wraps around the chair's bottom-rail support, the lower flexible extension 32 may attach back onto to the corresponding right and left side (e.g., FIG. 6), thus securing the enclosure 10 to the lower left and right sides of the chair frame assemblies. For example, the lower flexible extensions 32 may include a releasable connector 34 (e.g., hook-and-loop) that releasably connects back onto the side of the enclosure 10 (e.g., onto a mating portion on the overlapping portion 19).

Figure 7:
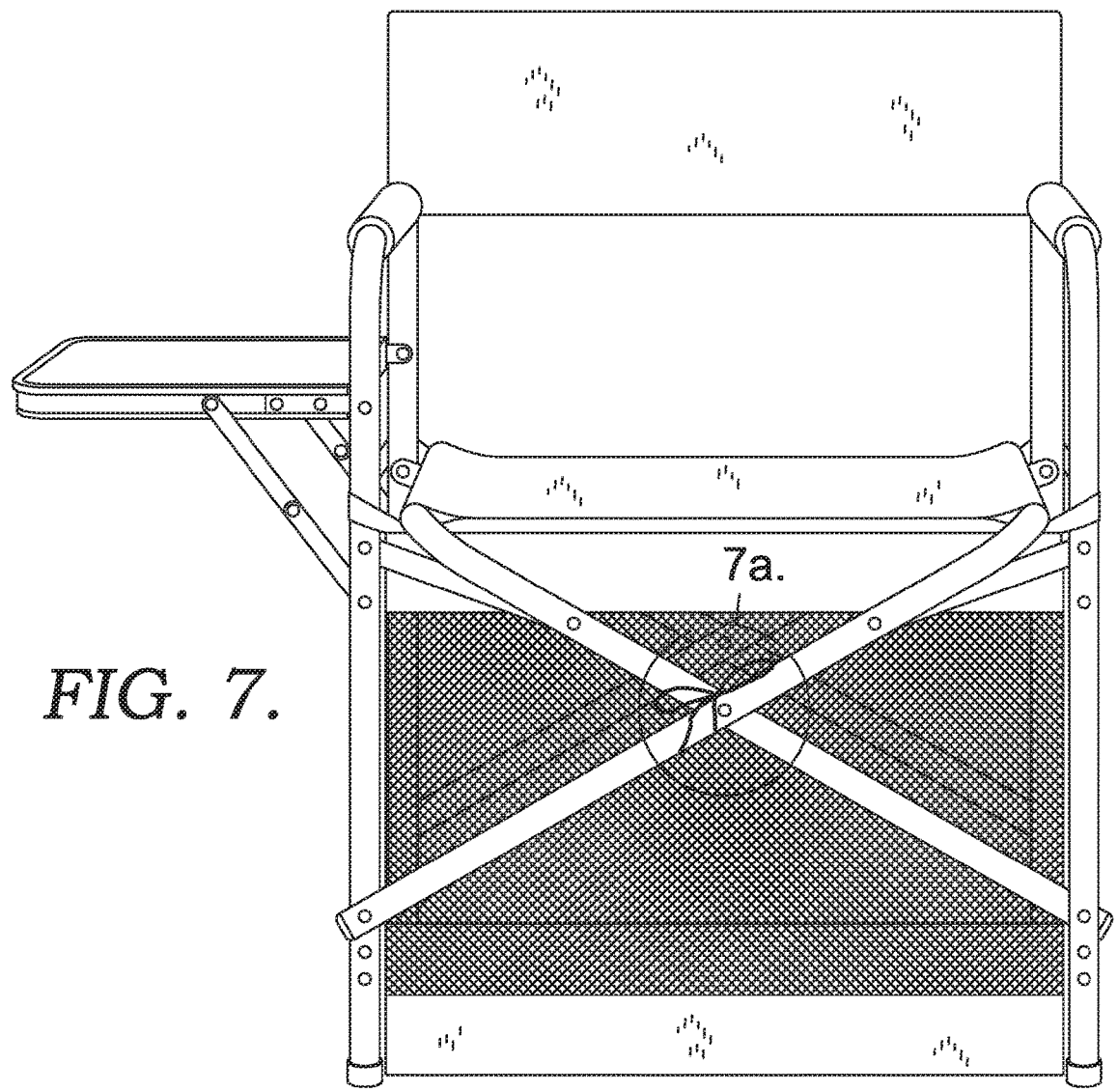
FIG. 7 depicts a front view of an under-seat enclosure with a connector attached to a center scissor pivot of the chair, in accordance with an aspect of the present disclosure.
Figure 7A:
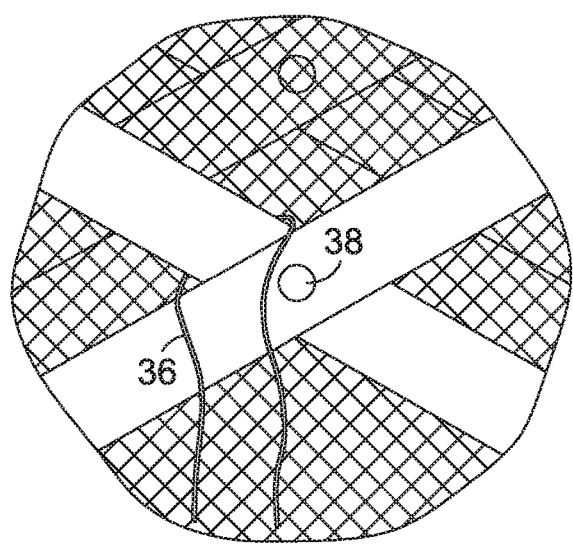
FIG. 7a depicts an enlarged view of the portion 7a identified in FIG. 7, in accordance with an aspect of the present disclosure.
Figure 9:
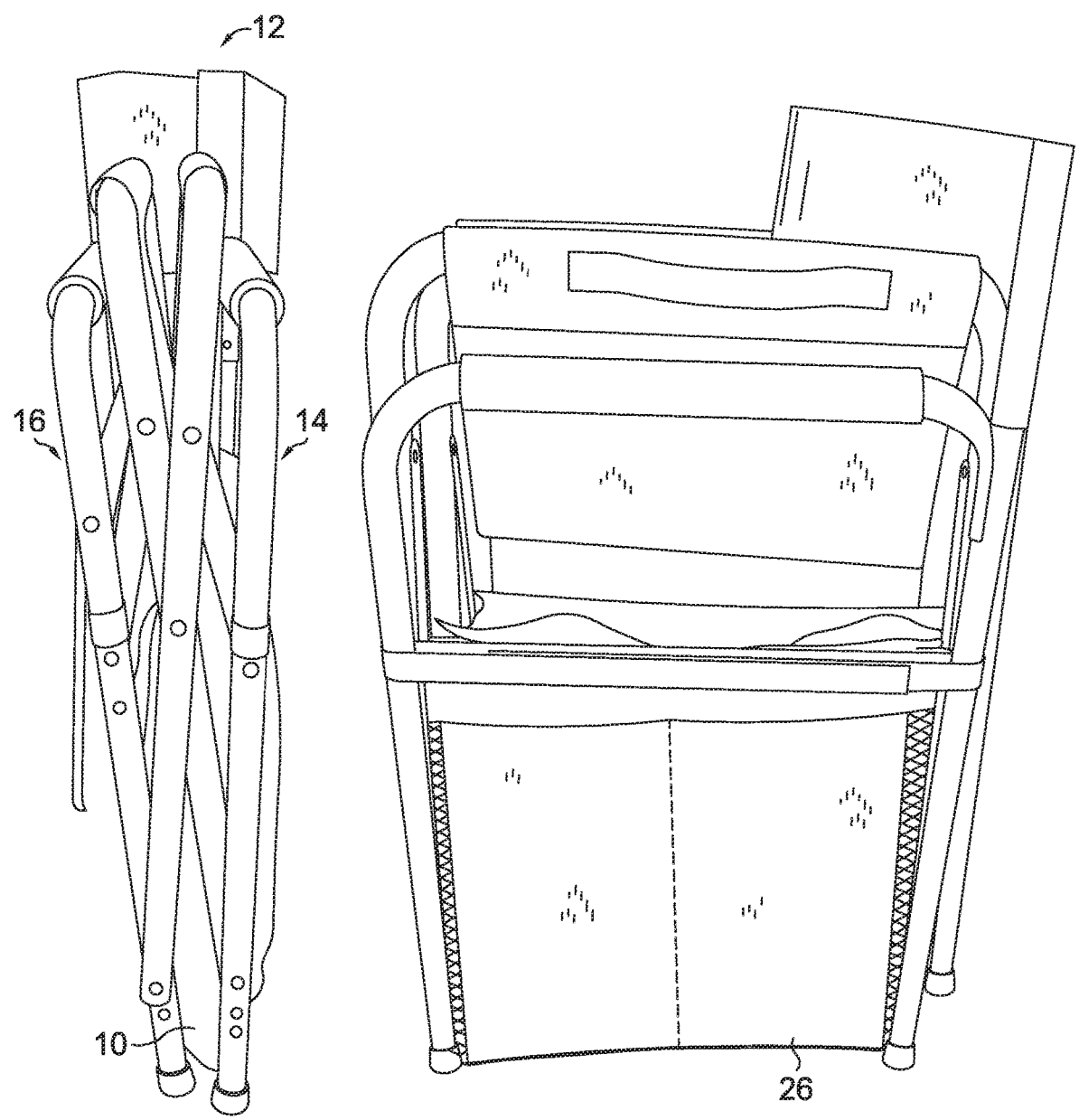
FIG. 9 depicts both a side view and a front view of a collapsed chair with the under-seat enclosure retained within the chair frame, in accordance with an aspect of the present disclosure.

In a further embodiment, the enclosure 10 includes a releasable connector 36 attached near a center of the front panel 22 and/or back panel 24. For example, FIGS. 1, 2, and 7 depict a tie connector 36. In an aspect of the disclosure, the reliable connector 36 is positioned to align near a center pivot point 38 of the chair-seat scissor frame support. Although the figures depict a tie connector, in other aspects, the connector may include other mechanisms, such as a c-clip or other releasable connector. As shown in FIG. 7, in one aspect, the connector 36 releasably attaches to the chair, at or above the center pivot point 38 of the chair-seat scissor frame support. As such, in one embodiment, when the chair-seat scissor frame is pulled upward during chair closure (e.g., FIG. 8), the connector 36 transfers a corresponding force (e.g., upward pull) near the center or middle of the enclosure 10, resulting in an upward and inward folding of the enclosure 10, such that it collapses within, and is retained among, the side frame assemblies 14 and 16 of the chair 12. For example, FIG. 9 depicts the enclosure 10 folded and retained within the frame of the chair 12. In an aspect of the present disclosure, one or more various elements of the enclosure 10 contribute to the ability to concomitantly collapse with, and be retained among, the chair. For example, in contrast to some conventional enclosures, the under-seat enclosure 10 does not wrap around the seat panel of the chair, which could impede the chair seat from folding (e.g., collapsing upward). In addition, the under-seat enclosure 10 includes the connector 36, which assists the enclosure 10 with collapsing and folding in coordination with the movement of the chair.

The one or more panels (e.g., top 20, bottom 18, front 22, back 24, right 26, etc.) may include various soft materials or textiles, such as knits, wovens (e.g., canvas), nonwovens, braids, laminates, etc. These textiles may be mostly solid (e.g., without perforations larger than 3 mm), such as a conventional woven canvas, nylon, ripstop, etc. In other instances, the textiles may have integral holes or perforations (e.g., perforations or apertures larger than 3 mm), such as a mesh textile. The textile may be made from various materials, such as nylon, polyester, Thinsulate® panel, foldable plastics, and the like.

Referring back to FIG. 2a, in a further embodiment, the enclosure 10 may include one or more access openings 40 in one or more of the sides (e.g., front, back, left side, or right side). For example, FIG. 2a depicts the access opening 40 in the left panel 26, and one or more of the other panels may also include an access opening. In one aspect, the access opening 40 may include a releasable fastener to selectively open and close the access opening 40, such as a zipper 42. Other types of releasable fasteners that could be used to releasably close the opening 40 include hook-and-loop, snaps, clips, buttons, ties, and the like.

In one aspect, the left side and the right side of the enclosure 10 are a soft, flexible material, such as a knit or woven textile. In other aspects, the left side and the right side may comprise a rigid panel, such as a wood, metal (e.g., aluminum), or rigid plastic (e.g., high-density polyethylene). In embodiments having a rigid left panel and a rigid right panel, the rigid panels may not impeded the chair from collapsing, since the side panels remain in a mostly planar configuration (e.g., do not fold) in the open position, the closed position (e.g., as depicted by the right side panel 26 in FIG. 9 showing the collapsed chair), and in the transition positions when being converted between the open and closed positions.

Figure 6:
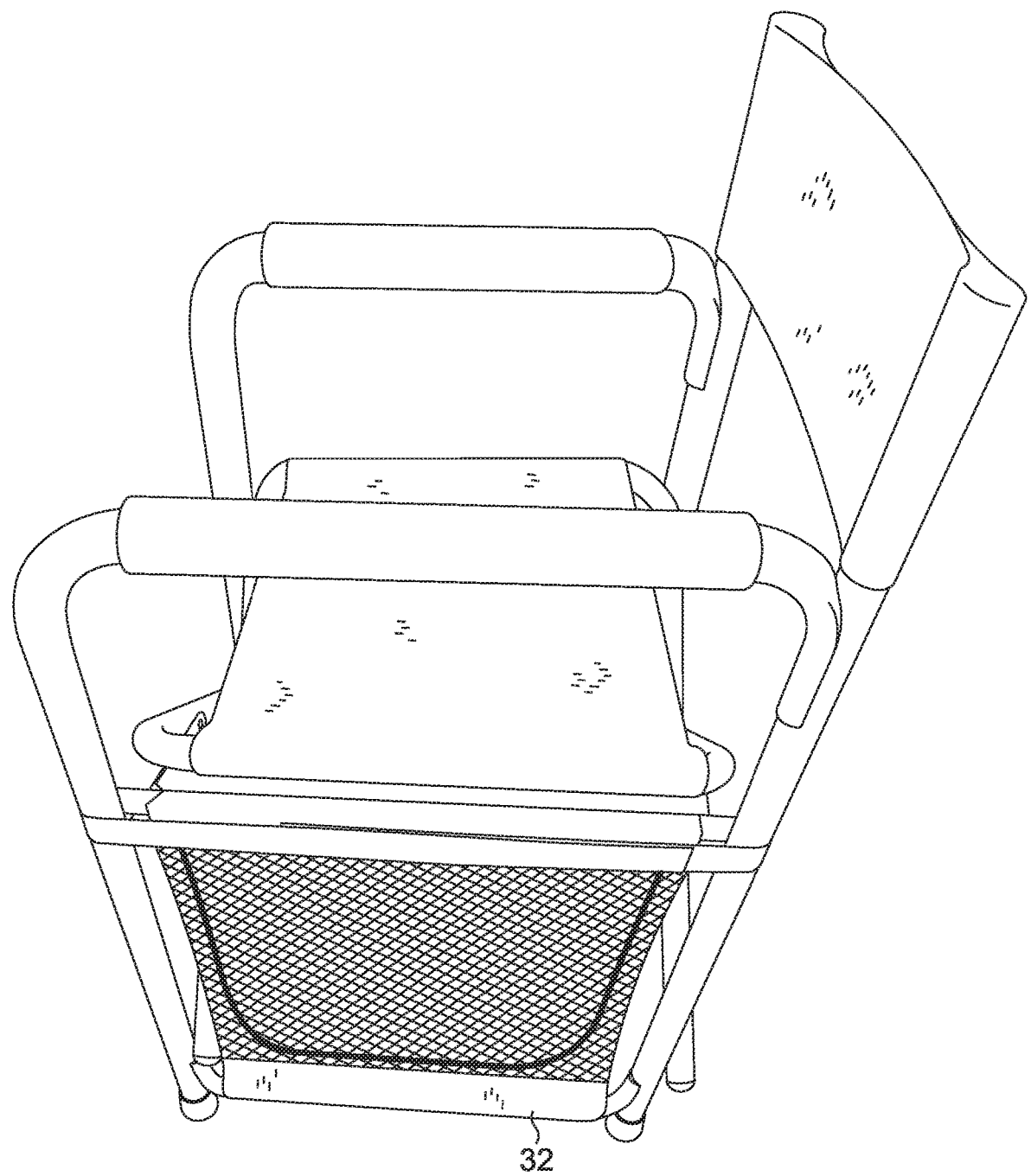
FIG. 6 depicts a side view of an under-seat enclosure attaching to a horizontal bottom frame member of a chair by an extension wrapping around the frame member, in accordance with an aspect of the present disclosure.
Figure 10A:
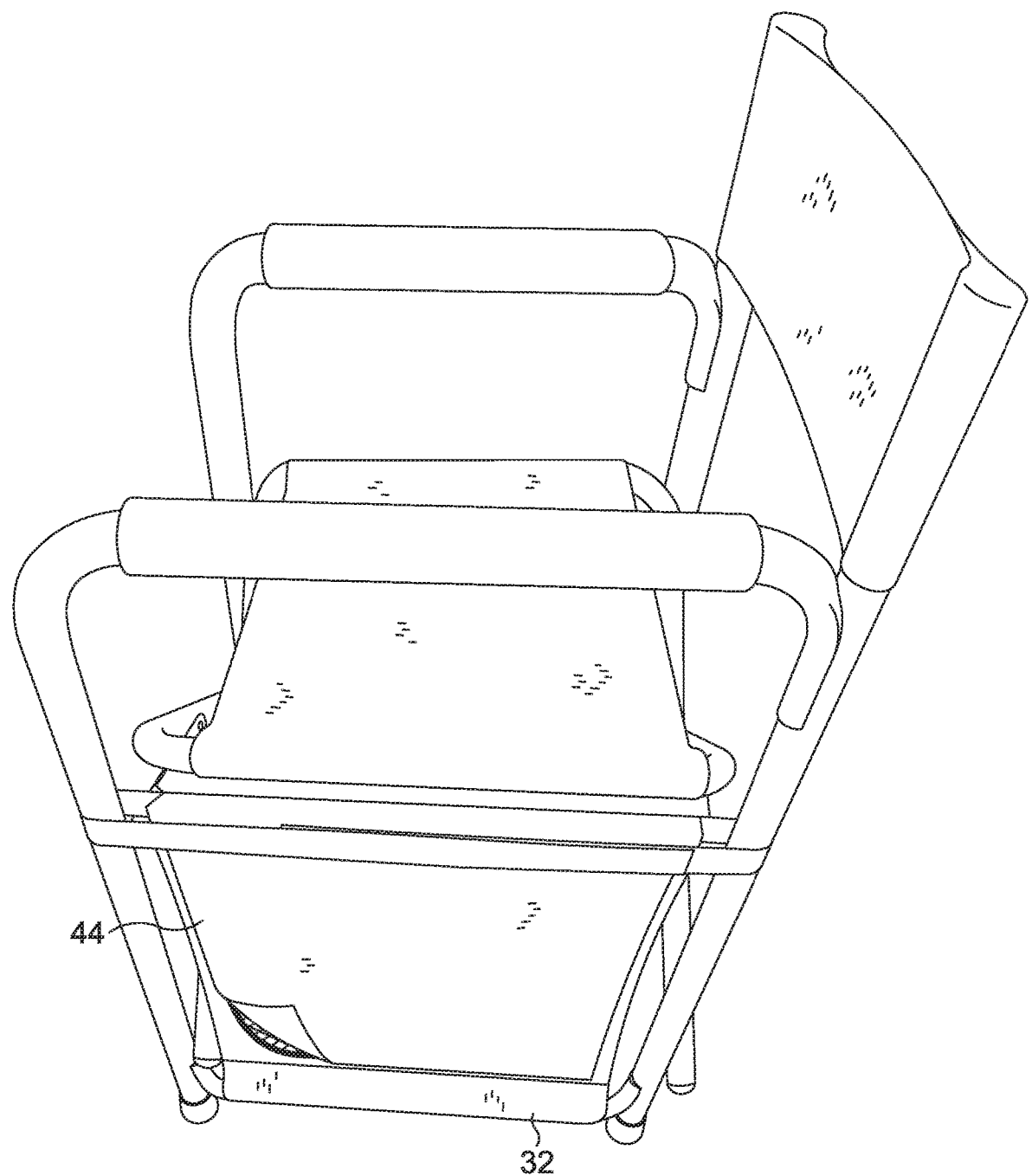
FIG. 10a depicts a side view of an under-seat enclosure with a panel cover affixed over a side panel, in accordance with an aspect of the present disclosure.

In a further embodiment, the enclosure 10 may include one or more secondary panels that attach over one or more panels or side of the enclosure 10. For example, referring to FIG. 10a, FIG. 10a depicts the enclosure 10 as shown in FIG. 6, except a secondary panel 44 has been attached to the left side and is obscuring the mesh panel illustrated in FIG. 6. The secondary panel 44 may attach near a top of a panel and hang down over the panel, at least partially covering the panel. For example, the secondary panel 44 may attach with a zipper, hook-and-loop, ties, snaps, clips, etc., or other connector, such as to the overlapping portion 21. The secondary panel 44 may include various elements. For example, the secondary panel 44 may include various configurations of pockets, pouches, or other accessory structures that complement the enclosure 10 or the chair 12 (e.g., for containment or storing of smaller items such as stakes, sunglasses, keys, etc.). In some instances, the secondary panel 44 may be a solid panel, whereas the underlying panel is mesh. In this instance, the secondary panel 44 may selectively provide privacy, shade, insulation, etc. by covering the mesh panel. In other aspects, the secondary panel 44 may include a portion (e.g., center region) for receiving branding or other insignia (e.g., by printing, embroidery, etc.). The enclosure 10 may include multiple secondary panels, which may be selectively attached to or detached from the enclosure for customization.

Figure 10B:
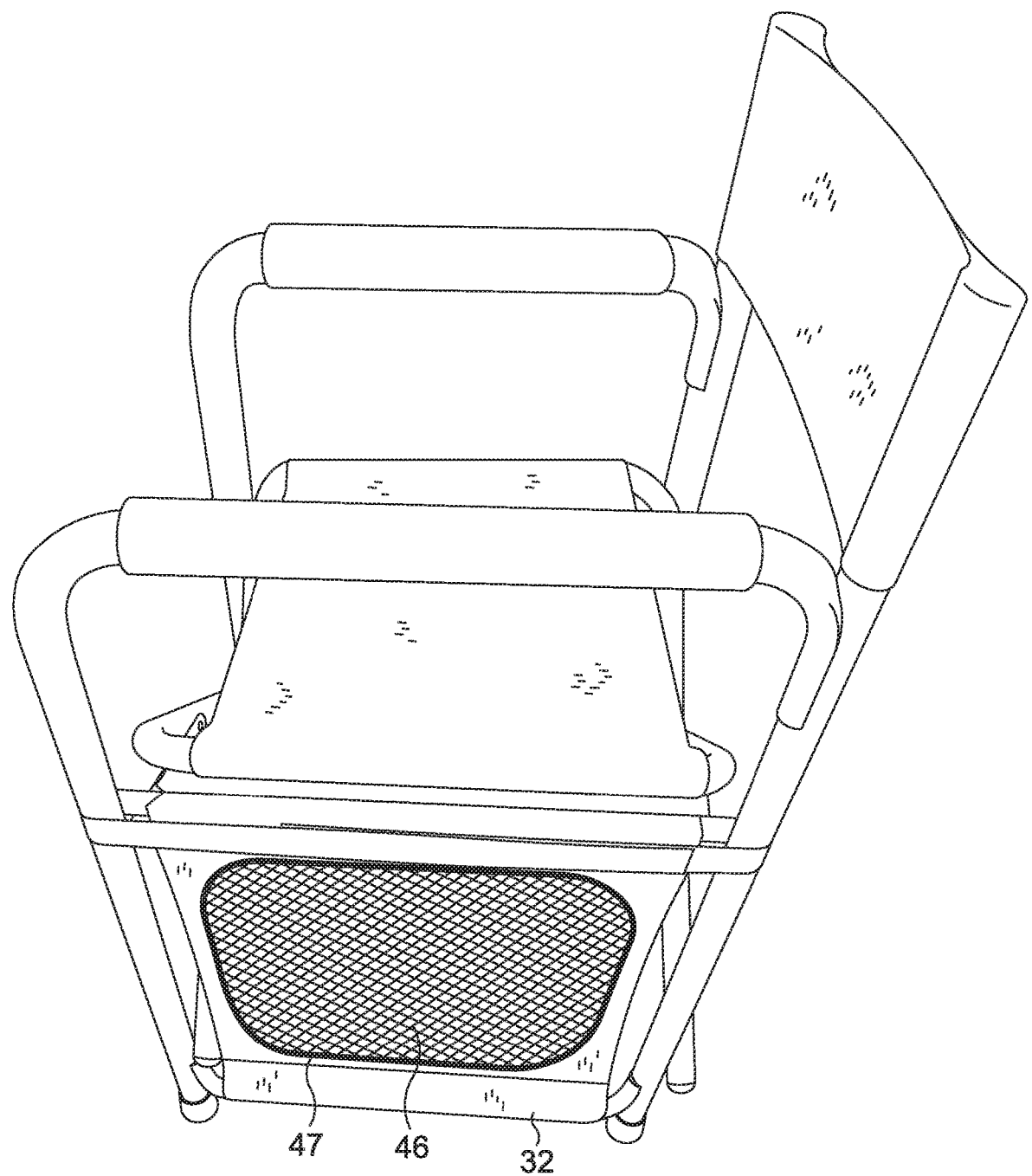
FIG. 10b depicts a side view of an under-seat enclosure with a mesh panel that is completely removable, in accordance with an aspect of the present disclosure.
Figure 10C:
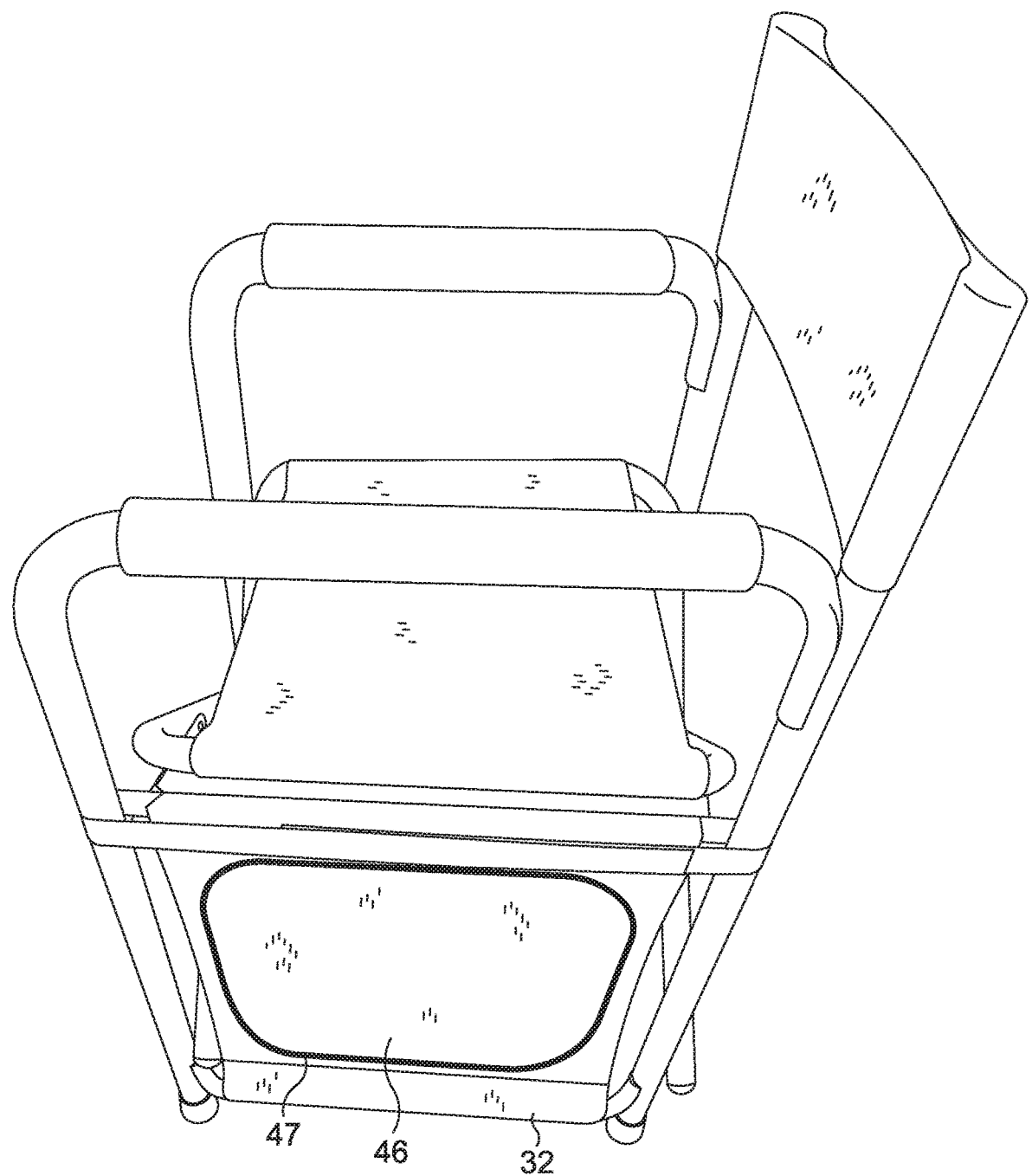
FIG. 10c depicts a side view of an under-seat enclosure with a non-mesh panel that is completely removable, in accordance with an aspect of the present disclosure.

Referring now to FIGS. 10b and 10c, FIGS. 10b and 10c depict an alternative embodiment. More specifically, one or more of the panels forming a side of the enclosure, or top of the enclosure, or bottom of the enclosure may include a removable panel portion (e.g., element 46 in FIGS. 10b and 10c) that is selectively partially removable (e.g., to allow access into the storage or containment area of the enclosure 10) or completely removable, such as for washing, replacing, etc. For example, the removable panel portion 46 may attach to the enclosure 10 by a releasable fastener 47 (e.g., zipper, hook-and-loop, etc.) that extends entirely around a perimeter of the removable panel portion 46. As such, the releasable fastener 47 may be partially opened to access the inside of the enclosure 10. In addition, the releasable fastener 47 may be fully opened to entirely remove the removable panel portion 46. In this manner, the removable panel portion 46 is customizable to include a mesh panel (e.g., FIG. 10b) for more ventilation, a solid panel (e.g., FIG. 10c) for more privacy/security, an insulated panel for more warmth, a panel with branding indicia for consumer preferences, and the like.

Figure 10D:
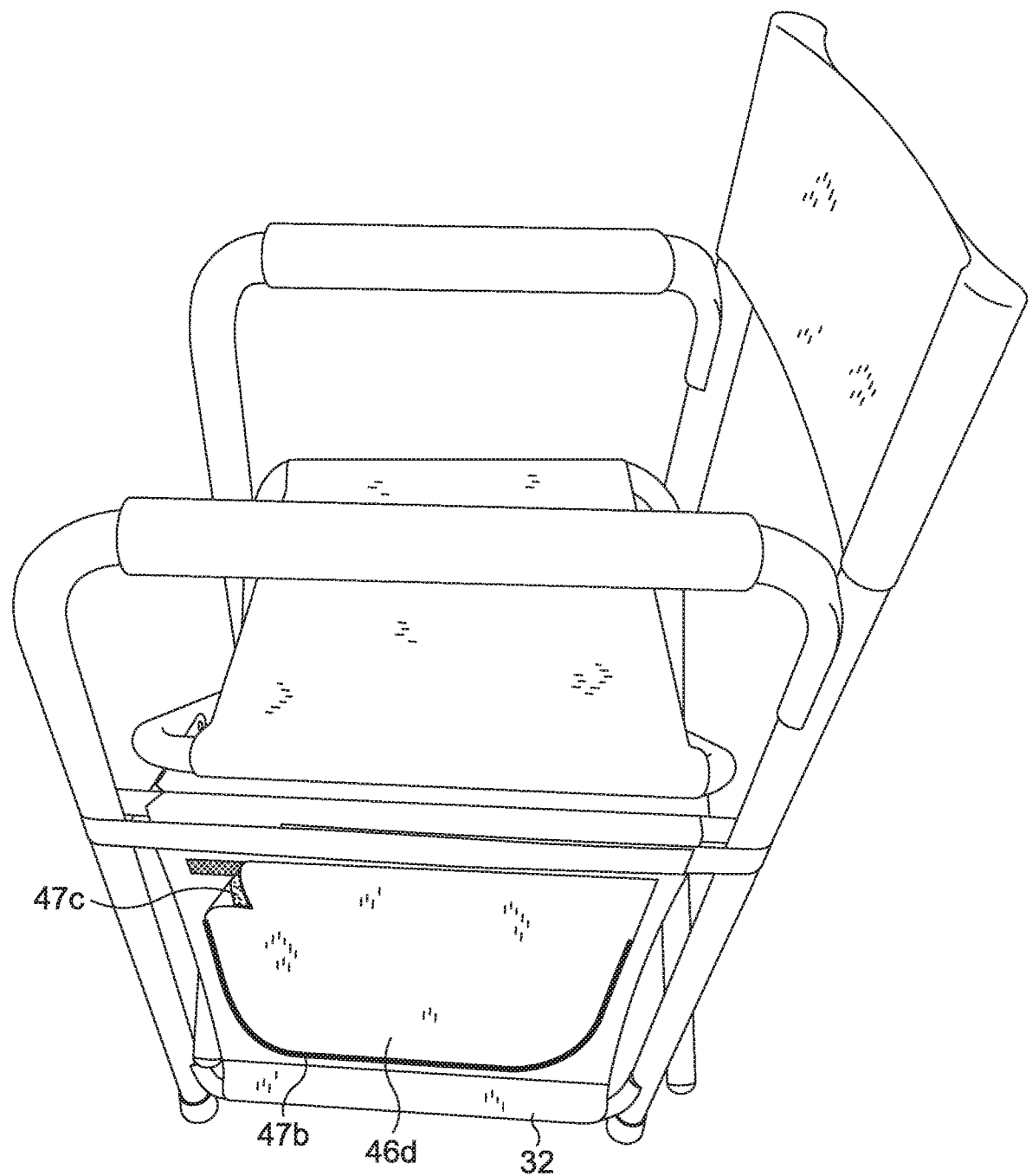
FIG. 10d depicts a side view of an under-seat enclosure with a panel that is completely removable and that includes a hook-and-loop connector across a top edge and a zipper connector around other edges, in accordance with an aspect of the present disclosure.

Referring to FIG. 10d, FIG. 10d illustrates an aspect that is similar to FIGS. 10b and 10c, except in FIG. 10d, the panel 46d is removably coupled to the under-seat enclosure using a combination of releasable connectors. For example, the panel 46d includes a hook- and loop connector 47c across a top edge or portion of the panel 46d, attaching the panel 46d to the enclosure. In addition, the panel 46d includes a zipper connector 47b positioned along the other edges of the panel 46d to releasably connect the other portions of the panel 46d to the enclosure 46d. Among other things, the combination of connectors may avoid bunching, misalignment, or other potential issues that may arise with a zipper extending along all sides of the panel 46d and including many turns and corners.

Accordingly, an aspect of the present disclosure may comprise a kit including an enclosure 10 with multiple removable panel portions (e.g., 46 or 46d). One of the removable panel portions may be used, whereas the other removable panel portion(s) may be reserved for use at a different time. Although FIGS. 10b and 10c and 10d depict the panel portion on a left side of the enclosure 10, any of the other sides or top or bottom of the enclosure may also include removable panel portions.

In a further embodiment, flexible loops 48 (e.g., FIG. 2a) are attached near the bottom or base panel 18 and near corners of the enclosure 10 for staking the expanded enclosure to the ground (FIG. 2). In addition, the enclosure 10 may include one or more pockets 50 (e.g., FIGS. 1 and 2) for storing stakes to be inserted through the loops 48. In one aspect, the loops 48 may help stabilize the chair and or the enclosure, such as when a pet is inside the enclosure or attached to the enclosure, such as using a leash attached to a ring (e.g., not shown) on the outside of the enclosure.

Moreover, the top panel 20 may include openings 52 (e.g., mesh windows, eyelet holes, or other openings of various sizes) for providing ventilation at the four corners (or at other locations near the top of the enclosure 10), such as for the upward release of an animal's body heat when the apparatus is used for pet containment.

Figure 12:
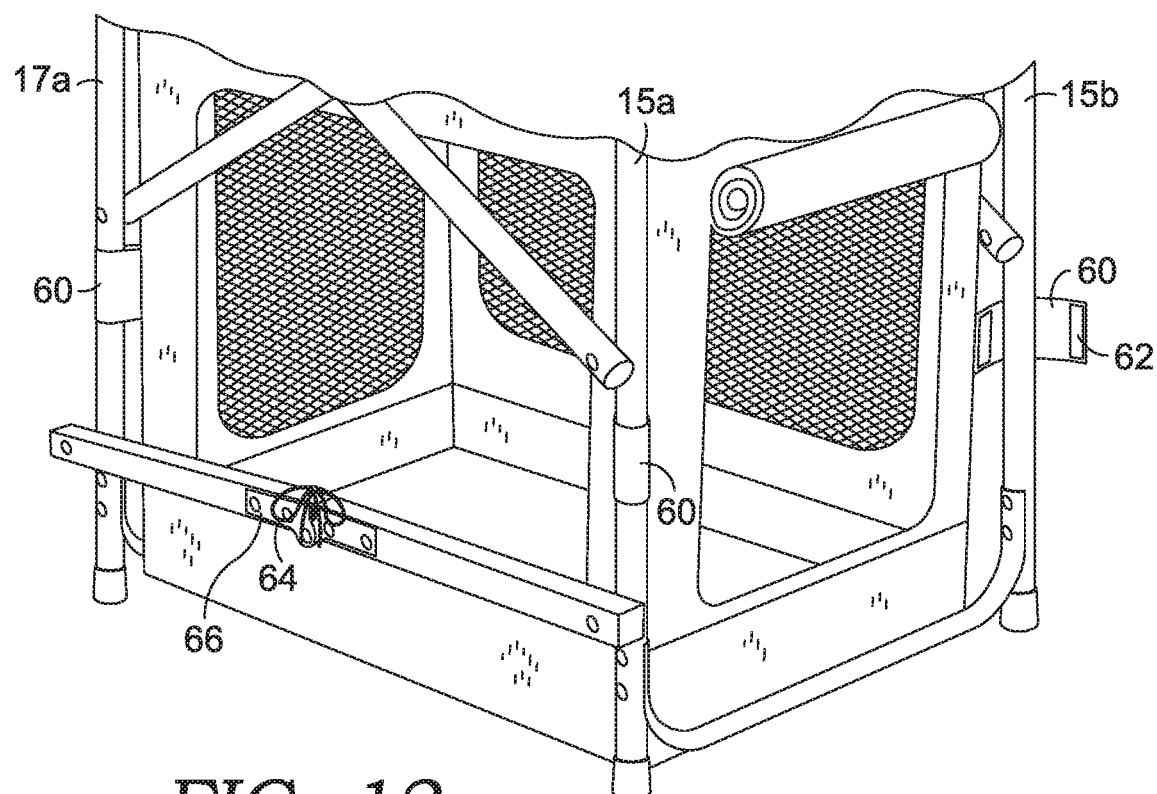
FIGS. 12 and 13 depict another aspect of an under-seat enclosure with another connector for attaching to a foldable front cross member of a chair, in accordance with an aspect of the present disclosure.
Figure 13:
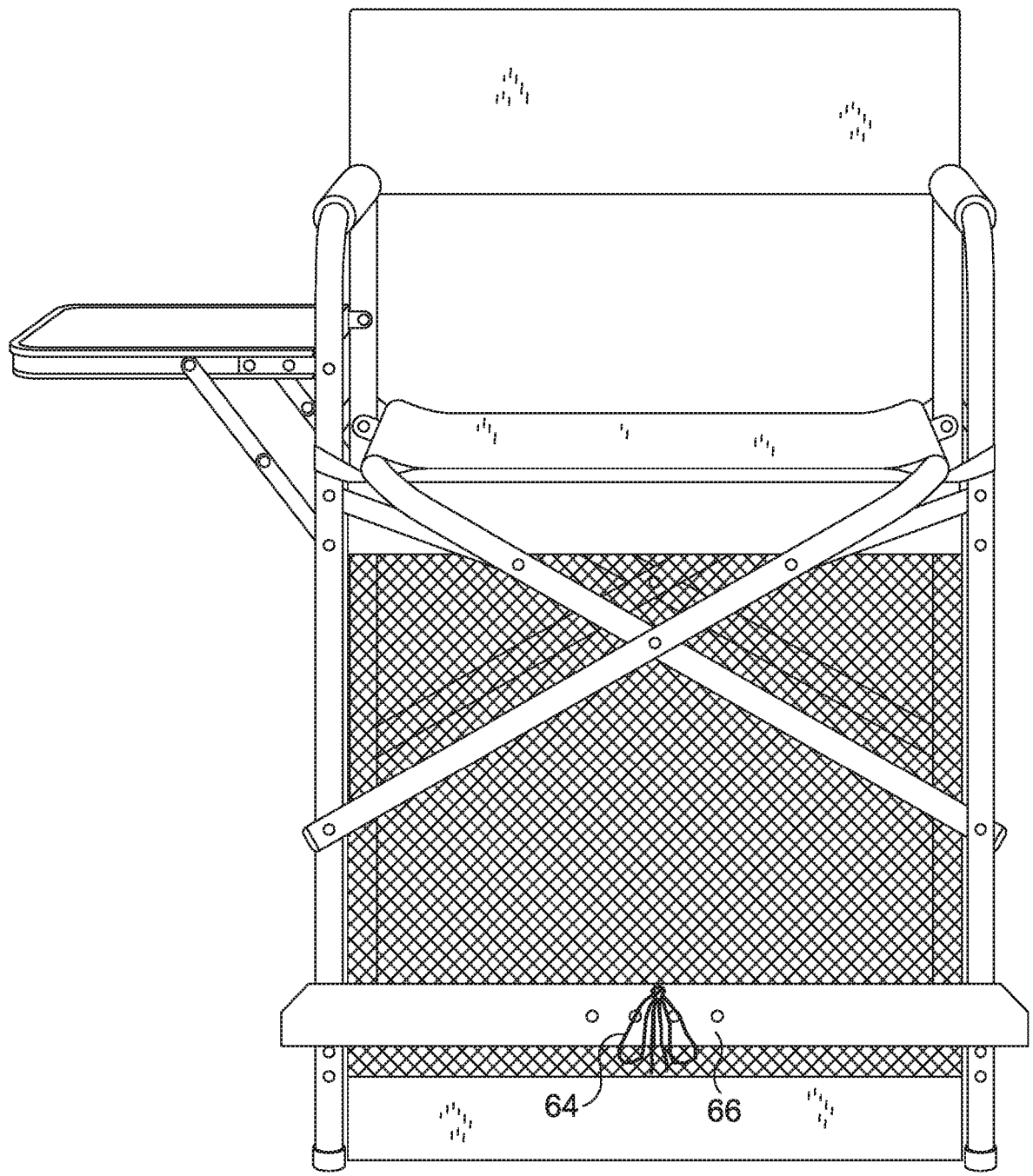

Referring now to FIG. 12, in another embodiment the enclosure 10 may include one or more flexible members 60 arranged along one or more of the four vertical edges of the enclosure and near the middle of the enclosure between the top and bottom. The flexible extensions 60 may releasably attach to or around one or more of the corresponding four vertical frame members of the chair's side frame assemblies as seen in FIG. 12. Among other things, the flexible extensions 60 may function to secure the enclosure to the chair and to stabilize side-to-side movement of the enclosure 10, particularly in taller chairs. The flexible member 60 may include a strap, webbing, panel, cable, chord, tie, etc., and may releasably tie to the upright or include a releasasble connection 62, such as hook-and-loop strips, c-clips, buckles, snaps, and the like. In one aspect, the flexible member 60 is attached (e.g., tied, secured to hook-and-loop, etc.) to the vertical support at a location below the attachment of the scissor frame pivot to the vertical support (as illustrated in FIG. 12).

Figure 14:
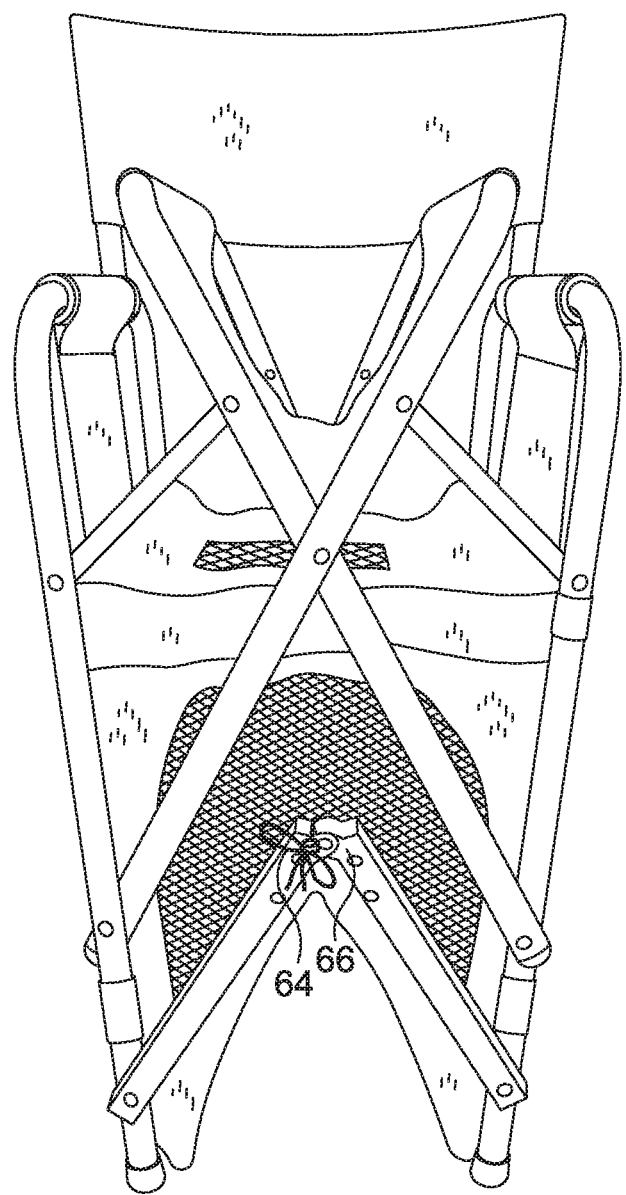
FIG. 14 depicts the under-seat enclosure in FIGS. 12 and 13 partially collapsing concomitantly with a chair, in accordance with an aspect of the present disclosure.
Figure 17:
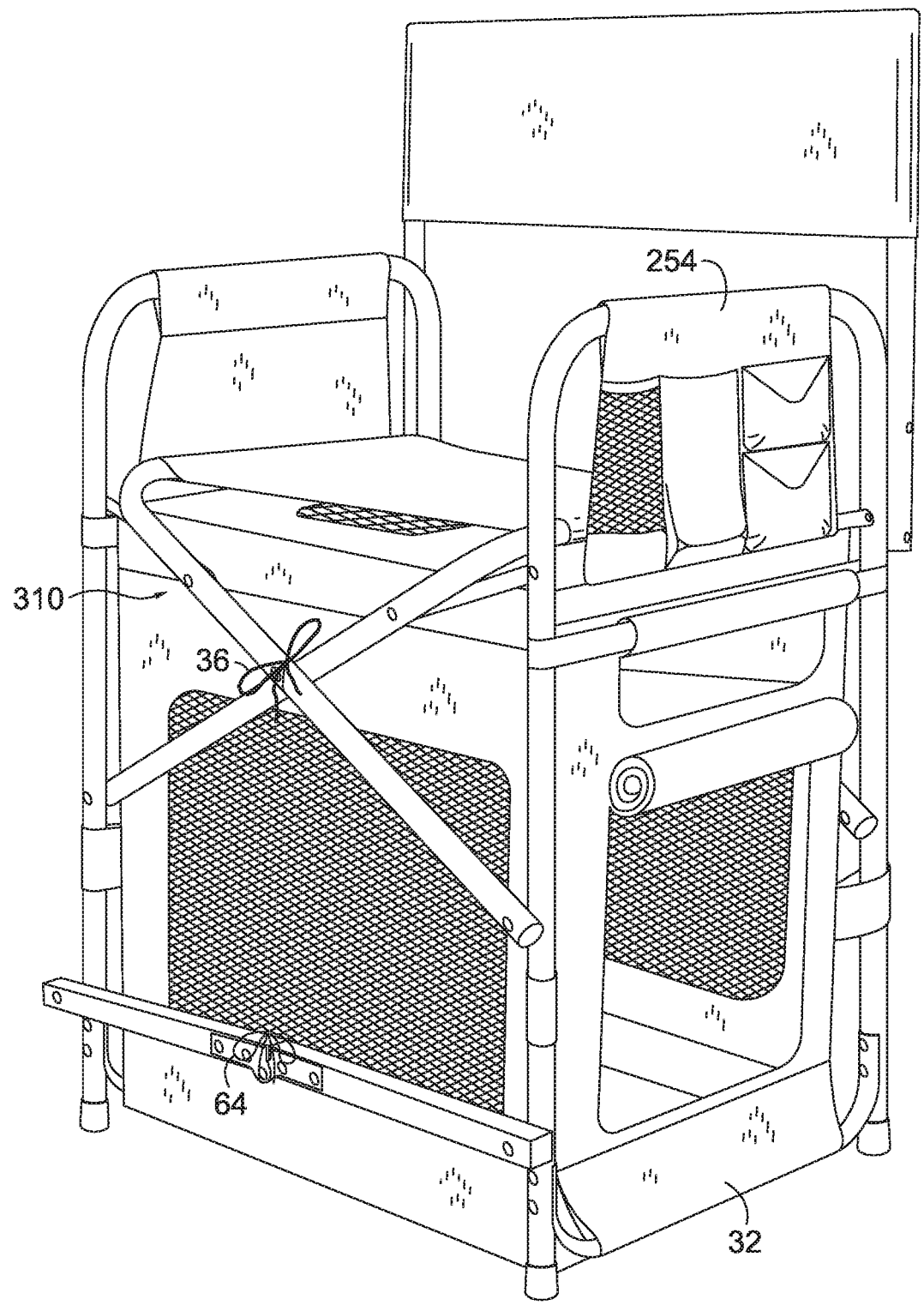
FIG. 17 depicts an under-seat enclosure combined with a taller version of a side-to-side folding chair having a footrest, in accordance with an aspect of the present disclosure.

As mentioned in portions of the disclosure, subject matter described in this disclosure may be usable with various chair types and sizes. For example, in contrast to the chair 12 in FIG. 1, the chair in FIG. 12 includes a front cross member 66 extending from the left side of the chair to the right side of the chair, and the front cross member may provide additional support for the chair, a footrest for a user, etc. The front cross member 66 may be in addition to the scissor frame with the center pivot point 38 and may include a hinge near the middle for collapsing or folding when the chair is being collapsed side-to-side. In another embodiment of the disclosure, the enclosure 10 may include another connector 64 attached near a center of the front panel 22. For example, FIGS. 2a-2c, 12-14, and 17 depict a tie connector 64, and in other aspects the connector 64 may include a strap with an alternative releasable connector (e.g., hook-and-loop, clip, etc.). In an aspect of the disclosure, the connector 64 is positioned to align with the front cross member 66, such as a foldable footrest (e.g., the connector 64 is at a height that corresponds with the height of the frame cross member 66 and near the hinge of the frame cross member 66). In some instances, these front cross members 66 are included with taller versions of side-to-side folding chairs. For example, FIG. 17 illustrates a taller version of a side-to-side folding chair with an under-seat enclosure, as compared with the shorter version depicted in FIG. 2c. In one embodiment, when the foldable front cross member 66 is pulled upward for chair closure, the connector 64 transfers a corresponding force (e.g., upward pull) near the center or middle of the enclosure 210, resulting in an upward and inward folding of the enclosure 210, such that it collapses within, and is retained among, the side frame assemblies 14 and 16 of the chair 12. This operation of the enclosure 210 is illustrated in FIG. 14. As depicted, a substantial portion of the enclosure 210 (including the base), and in some aspects all of the enclosure, is secured entirely between the chair side frame assemblies.

Figure 15:
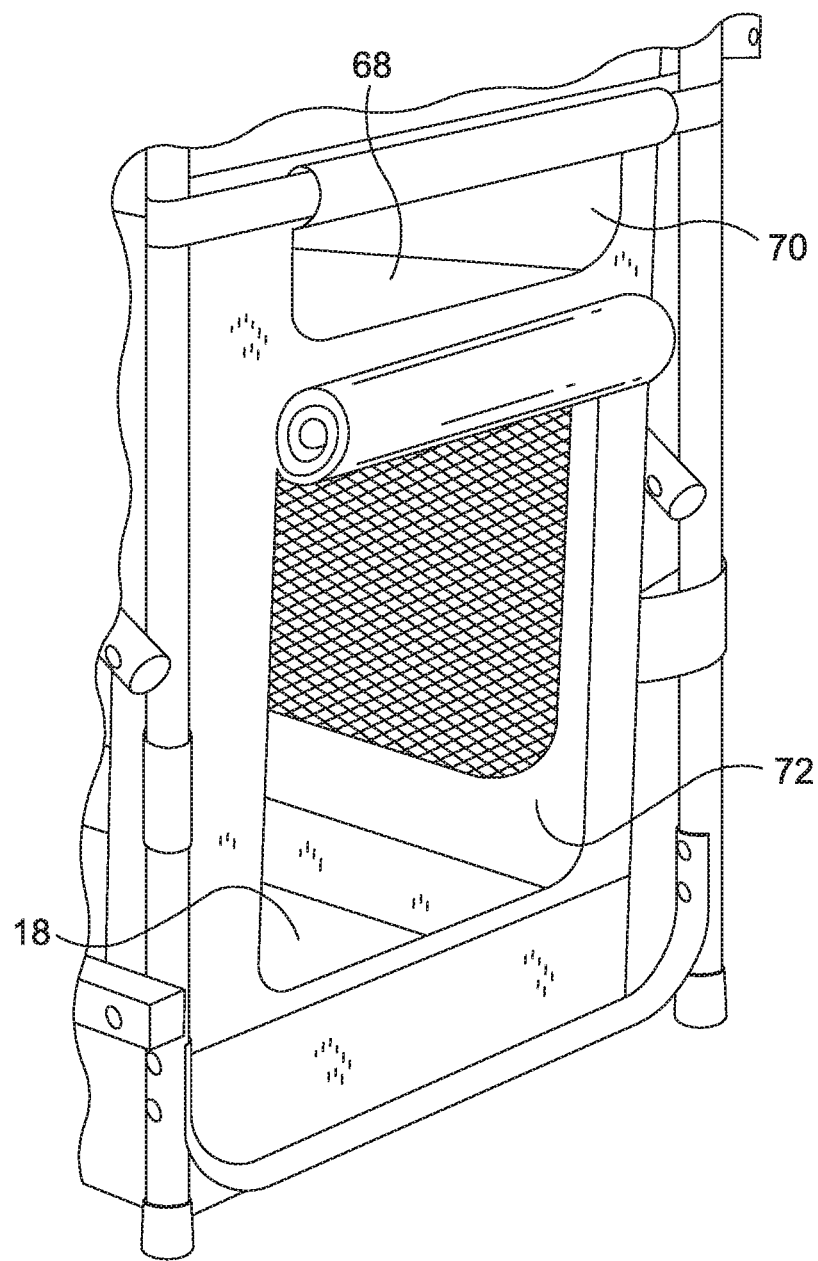
FIG. 15 depicts an under-seat enclosure with multiple interior compartments, in accordance with an aspect of the present disclosure.
Figure 16:
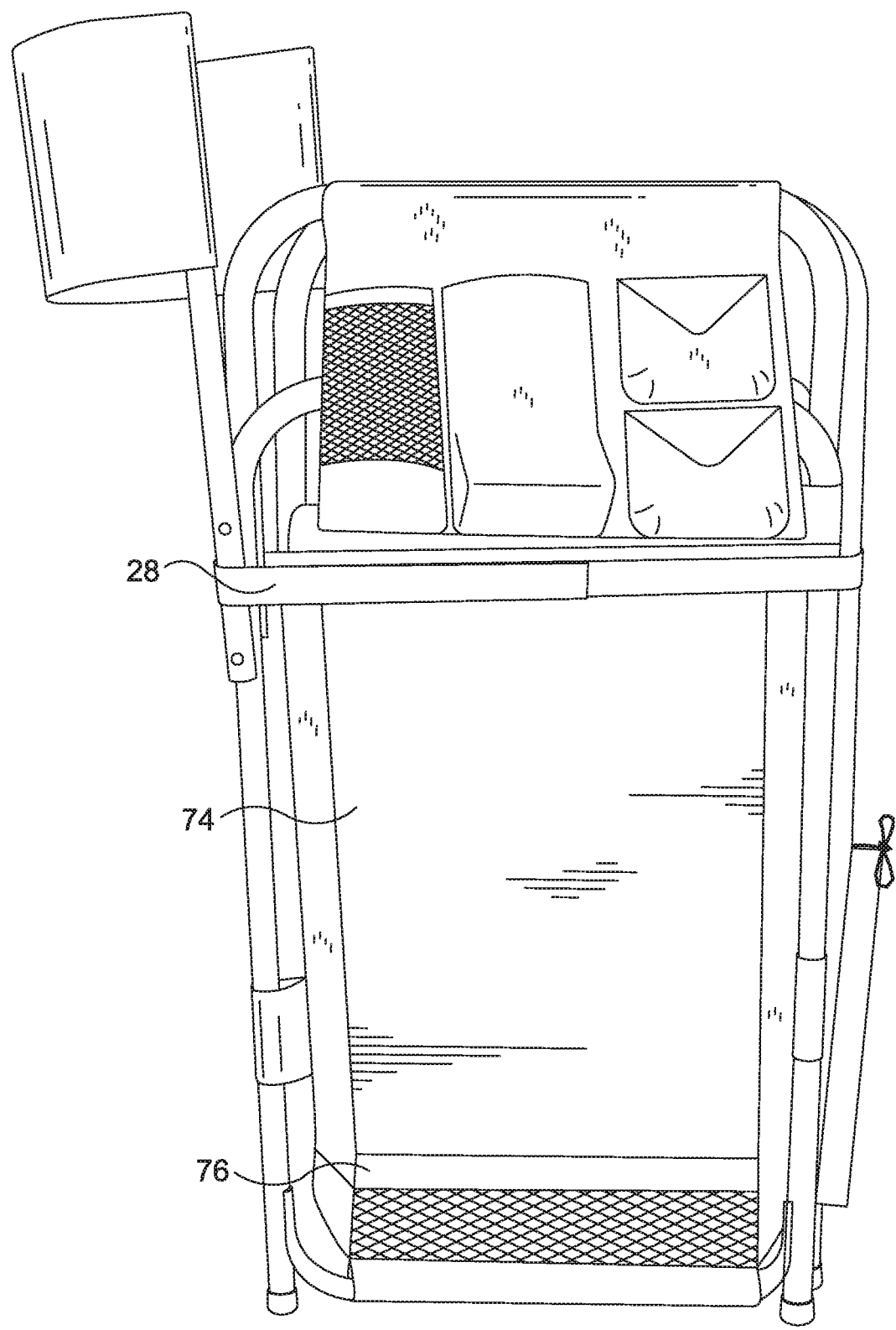
FIG. 16 depicts a collapsed chair with an under-seat enclosure and a stowed rigid insert, in accordance with an aspect of the present disclosure.

In another embodiment, the enclosure 10 includes one or more horizontal interior panels within the space enclosed by the vertical sides of the enclosure 10. For example, in FIG. 15, a horizontal panel 68 is positioned in the enclosure 10 and divides the interior space into multiple separate containment areas 70 and 72 (e.g., a top compartment and a bottom compartment). Alternatively, the horizontal panel(s) might extend only partially into the open interior space to create one or more horizontal ledges or loft areas (not shown). The one or more interior panel(s) may include the same or similar material as the other panels (e.g., canvas, nylon, mesh, Thinsulate, or other insulated fabrics or soft, foldable plastics, or a combination as best suited for intended use of the apparatus/unit), so as to fold and collapse with the concomitant collapse of the apparatus on the chair's closing.

In a further embodiment, the enclosure 10 may include one or more interior horizontal inserts 74 made of rigid materials (e.g., aluminum, steel, wood, plastic, etc.). The rigid insert may be flat or have pan sides and may be inserted horizontally to fit within the base of the apparatus, or, alternatively, on the top of any interior horizontal flexible dividers. For example, in FIG. 15, the insert may be positioned atop the panel 18 and/or 68. In addition, the rigid insert may have a hinge extending front to back, enabling the insert to fold down the center, such as when the chair collapses in a side-to-side manner. Alternatively, or additionally, the interior insert 74 may be removable between uses so as not to impede the chair's closing and the concomitant collapse of the apparatus within the side frames of the chair. In one aspect, the inset 74 may be stored is a position exterior to the enclosure 10, such as in a retainer 76 along the base. Among other things, the retainer 76 may include a shallow pocket, sleeve, strap etc. One end of the rigid insert may be stored within retainer 76, while the other end might rest within the flexible members 28 encircling the chair's side frame assemblies.

Referring to FIG. 17, an under-seat enclosure 310 is depicted together with a chair 112 that is taller than the chair in FIG. 1. The enclosure 310 includes many of the elements described in other portions of this disclosure, including but not limited to the upper flexible extensions 254 with accessory components, the horizontal divider separating the interior space into multiple compartments, the connectors 36 and 64, etc. Except as explicitly described herein or explicitly depicted in the figures, the enclosure 310 may include some similar elements as the enclosures 10, 110, and 210, and for the sake of brevity and readability, these similar elements may be describe with respect to only one of the enclosures and it is understood that the other enclosure(s) may also include those similar elements.

In various embodiments of the present disclosure, the under-seat enclosure attaches to a chair using one or more releasable connectors. In a further embodiment of the present invention, the chair may comprise one part of a means for releasable attachment (e.g., part of hook-and-loop, snap, clip, zipper etc.), which can be engaged to a corresponding means for releasable attachment on the enclosure (e.g., mating part of hook-and-loop, snap, clip, zipper etc.). In an alternative embodiment, the enclosure may comprise the means for releasable attachment (e.g., strap or panel with both mating parts of hook-and-loop, snap, clip, zipper, etc.), such that the enclosure can be coupled to a chair regardless of whether the chair comprises means for releasable attachment.

There is further provided a method of storing items or containing a pet, the method comprising enclosing the space underneath the chair's seat and within the chair's legs with a releasably attached bag. There is further provided a pet containment apparatus for use with a chair, the apparatus comprising a means for enclosing space underneath the chair within the structure of the chair's side frame assemblies.

The present invention discloses an apparatus for pet containment and/or storage of personal items for use with a chair the type of chair illustrated and discussed herein comprises a canvas folding chair also commonly referred to as a director's chair or captain's chair. However, this invention is not limited to use with those folding and collapsible chairs illustrated and discussed herein. One of ordinary skill in the art would recognize how the cover disclosed herein could be used with other styles of chairs.

The subject matter of the present disclosure includes several advantages. Because the enclosure can collapse with and be stored and transported while attached to a folding chair, this subject matter reduces the number of items that one must haul to and from events and reduces the items one must store while not in use. In addition, as opposed to a free-standing enclosure, when in use this under-seat enclosure saves space and reduces obstacle clutter because it utilizes the free space underneath a chair. The subject matter of this disclosure may possess additional benefits. For example, embodiments comprise a removable enclosure, which allow for the enclosure to be washed. In addition, embodiments including mesh panels provide ventilation to help moderate the comfort of pets inside the enclosure. Other embodiments comprised of solid flexible materials for side panels allow the apparatus to perform as any number of devices such as a cooler if constructed of a material such as Thinsulate®. Furthermore, embodiments comprise flaps and/or pockets that are customizable with branding and that provide a mechanism for transporting or storing other items with the enclosure.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

An aspect of the present disclosure is directed to an enclosure (e.g., 10, 110, 210, and 310) usable under a seat of a side-to-side folding chair. The enclosure comprises a plurality of walls enclosing an interior volume, the plurality of walls comprising at least a front portion, back portion, left portion, and right portion. For example, the panels 18, 20, 22, 24, and 26 form a plurality of walls that enclose an interior volume. The enclosure includes a first flexible extension (e.g., 28, 128*a*, 32, or 54) on the left portion and a second flexible extension (e.g., 28, 128*a*, 32 or 54) on the right portion, the first and second flexible extensions to releasably connect to a respective side frame assembly of the side-to-side folding chair. In addition, the enclosure includes a releasable connector (e.g., 36 or 64) on the front portion to connect to a pivot point (e.g., 38 or 66) of the side-to-side folding chair.

Another aspect of the present disclosure is directed to a method of enclosing a volume beneath a seat of a side-to-side folding chair. The method includes positioning an enclosure (e.g., 10, 110, 210, or 310) beneath the seat. The enclosure includes a plurality of walls enclosing an interior volume, and the plurality of walls includes at least a front portion, back portion, left portion, and right portion. The method also includes attaching a first flexible extension (e.g., 28, 128*a*, 32, and 54) to a first side frame assembly (e.g., 14), and attaching a second flexible extension to a second side frame assembly (e.g., 16). In addition, the method includes attaching the front portion (e.g., using 36 or 64) to a pivot point (e.g., 38 or 66) of the side-to-side folding chair.

A further aspect of the present disclosure is directed to an enclosure (e.g., 110, 210, and 310) usable under a seat of a side-to-side folding chair. The enclosure includes a plurality of walls enclosing an interior volume, the plurality of walls comprising at least a front portion, a back portion, a left portion, a right portion, a top portion, and a bottom portion, the top portion for positioning beneath the seat of the side-to-side folding chair. The enclosure includes a left upper flexible extension (e.g., 54 or 154) positioned near a first transition between the left portion and the top portion, the left upper flexible extension to releasably connect to a left side frame assembly of the side-to-side folding chair above a first pivot linkage connecting the left side frame assembly to a seat assembly of the side-to-side folding chair. In addition, the enclosure includes a right upper flexible extension (e.g., 54 or 154) positioned near a second transition between the right portion and the top portion, the right upper flexible extension to releasably connect to a right side frame assembly of the side-to-side folding chair above a second pivot linkage connecting the right side frame assembly to the seat assembly of the side-to-side folding chair.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1. An apparatus (e.g., 10, 110, 210, or 310) that releasably attaches to the left and right side frame assemblies of a collapsible, portable chair; such that when the chair is opened and setup for use, the enclosure expands concomitantly with, and occupies the area beneath the seat of the chair, and within the chair side frame assemblies, to create an enclosed space for pet or personal item containment, wherein such attachments do not interfere with the functioning mechanisms of the chair or with the intended purpose of the chair as seating, and wherein when the chair is closed, the enclosure compresses and folds completely within the collapsed side frame assemblies of the chair to remain with the chair when being store, the enclosure comprising: a base panel, the base panel having base-panel edges; a top panel, the top panel having top-panel edges, and a set of side panels to include identical front and back side panels, and, dependent only on the desired number of access openings, identical left and right side panels; and wherein each of these side panels and attaches to a respective top-panel edge and base-panel edge, and wherein each of these side panels is connected to adjacently positioned side panels and, such that when all of the panels are connected, an enclosure of space or interior volume is created (e.g., a complete, 6-sided structure having, in general a front portion, back portion, left portion, right portion, top portion, and bottom portion).

Clause 2. The apparatus of Clause 1, wherein elongated flexible members (e.g., 28) are attached or releasably attached along the top panel left and right side upper edges, and extend beyond the four corners of the top panel of the apparatus at the front and back.

Clause 3. The apparatus of any of Clause 1 or 2, wherein elongated flexible member extensions (e.g., 28 or 128) near or at the upper four corners of the apparatus, releasably attach to, or around, the corresponding vertical components of the right and left side frame assemblies of the chair, front and back, at and above the chair seat frame pivot braces.

Clause 4. The apparatus of any of clauses 1 through 3, wherein elongated flexible member extensions (e.g., 28 and 128) completely encircle one or both the right and left side frame assemblies of the chair, front to back, to meet and releasably attach, one flexible member extension to the other.

Clause 5. The apparatus of any of clauses 1 through 3, wherein elongated flexible member extensions (e.g., 28 and 128) encircle one or more of the vertical supports of the right and left side frame assemblies of the chair and releasably attach back to the upper edge of the top panel on one or both of the top panel's left and right sides, front and back.

Clause 6. The apparatus of any of clauses 1 through 5, wherein elongated flexible member extensions (e.g., 28 and 128) near the upper corners of the apparatus comprise cord, elastic tape, fabric tape, webbing or a combination thereof; and engage using hook-and-loop tape, ties, buckles, zippers, snaps, buttons or clips.

Clause 7. The apparatus of any of clauses 1 through 6, wherein the base panel has one or more flexible extensions (e.g., 32) on both the left side and the right side, along the bottom edge, front to back.

Clause 8. The apparatus of clause 7, wherein the flexible extensions on the left and right sides of the base panel surround the horizontal bottom support rail of the chair's corresponding left and right side frame assemblies to releasably attach back to the corresponding right and left side base-panel edges of the apparatus, thus securing the apparatus to the lower left and right sides of the chair frame assemblies.

Clause 9. The apparatus of clause 8, wherein the base panel extensions releasably connect to the corresponding base-panel edge using hook-and-loop tape, ties, buckles, zippers, snaps or clips.

Clause 10. The apparatus of any of clauses 1 through 8, wherein a set of flexible members (e.g., 36) is attached to the center of the front and back panels of the apparatus, such that when the chair and attached apparatus are in the expanded, open position, the flexible members are at the same height and location as the center pivot point of the chair seat scissor frame support.

Clause 11. The apparatus of clause 10, wherein the flexible members at the center of both the front and back side panels of the apparatus attach or releasably attach to the chair, at or above the center pivot point of the chair seat scissor frame support.

Clause 12. The apparatus of clause 11, wherein when the chair seat scissor frame is pulled upward for chair closure, the apparatus attachment at or above the center pivot, creates an upward pull on the center of the base of the apparatus, resulting in the upward and inward folding of the entire apparatus such that it remains completely within the chair's side frame assemblies when the chair is in the fully collapsed position.

Clause 13. The apparatus of any of clauses 11 or 12, wherein the methods of attachment at or above the pivot point of the chair may be accomplished by attachment or releasable attachment at the center of the front and back panels of the apparatus directly to the chair seat scissor frame, or by attachment or releasable attachment using various methods, to the center of the chair seat itself.

Clause 14. The apparatus of any of clauses 10 through 14, wherein methods of releasable attachment at or above the pivot point of the chair seat scissor frame support comprise ties, hook-and-loop tape, elastic tape, webbing, buckles, snaps, clips or a combination thereof.

Clause 15. The apparatus of any of clauses 1 through 14, wherein one or more side panels and are composed of soft materials such as canvas, nylon, mesh, Thinsulate® or other insulated fabrics or soft, foldable plastics, or a combination as best suited for intended use of the apparatus/unit, but will not be limited to only those materials listed.

Clause 16. The apparatus of any of clauses 1 through 15 further comprising, one or more access opening(s) (e.g., 42) in one or more of the left, right, front and/or back side panels, wherein the access opening is releasably closable and provides access to the interior space of the apparatus and its contents when the chair is opened for use and the apparatus is fully expanded.

Clause 17. The apparatus of clause 16, wherein the access opening is releasably closable using hook-and-loop tape, ties, buckles, zippers, snaps or clips.

Clause 18. The apparatus of any of clauses 1 through 14, wherein one or both left and right side panels are made up of a rigid material such as aluminum, steel or plastic, as best suited for intended use of the apparatus, but will not be limited to only those listed.

Clause 19. The apparatus of clause 18, wherein one or both left and right side panels has a hinged and lockable door, for access to the interior of the apparatus and its contents when the chair is open for use and the apparatus is in the fully expanded position.

Clause 20. The apparatus of any of clauses 1 through 19, wherein separate flexible flaps (e.g., 44) are attached or releasably attached near one or more of the upper edges of the top panel, to hang down and substantially cover one or more of the corresponding side panels.

Clause 21. The apparatus of clause 20, wherein the flaps used to cover the side panels include a combination of pockets, straps and pouches, for containment or storing of smaller items such as stakes, sunglasses, keys, etc. and are customizable with imprinting and or embroidery.

Clause 22. The apparatus of clauses 20 or 21, wherein methods of releasable attachment comprise ties, hook-and-loop tape, elastic tape, webbing, buckles, buttons, snaps, clips or a combination thereof.

Clause 23. The apparatus of any of clauses 1 through 22, wherein flexible loops (e.g., 48) are attached to the base panel at the four corners for staking the expanded apparatus to the ground.

Clause 24. The apparatus of clause 23, wherein one or more pockets (e.g., 50) are attached to one or more of the left, right, front or back side panels for the storage of stakes.

Clause 25. The apparatus of any of clauses 1 through 24, wherein the top panel includes mesh windows (e.g., 52), eyelet holes or other means of providing ventilation on the top panel of the apparatus.

Clause 26. The apparatus of any of clauses 1 through 25, wherein one or more flexible member extensions (e.g., 60) may be attached along one or more of the four vertical edges of the apparatus.

Clause 27. The apparatus of clause 26, wherein the flexible member extensions along one or more of the four vertical edges of the apparatus, releasably attach to, or around, the corresponding vertical components of the right and left side frame assemblies of the chair.

Clause 28. The apparatus of clauses 26 or 27, wherein the flexible member extensions along the four vertical edges of the apparatus comprise cord, elastic tape, fabric tape, webbing or a combination thereof; and engage using hook-and-loop tape, ties, buckles, zippers, snaps, buttons or clips.

Clause 29. The apparatus of any of clauses 1 through 28, wherein one or more flexible member extensions (e.g., 54 or 154) is anchored along one or both the upper left and right side edges of the top panel, extending upward between the front and back corners of the apparatus.

Clause 30. The apparatus of clause 29, wherein the flexible member extensions (e.g., 54) releasably attach around one or both of the corresponding left and right side armrests of the chair.

Clause 31. The apparatus of clause 30 wherein flexible member extensions, might comprise fabric flaps suitable for the inclusion of various storage pockets, or a mixture of cord, elastic tape, fabric tape, webbing or a combination thereof; and engage using hook-and-loop tape, ties, buckles, zippers, snaps, buttons or clips.

Clause 32. The apparatus of any of clauses 1 through 31, and when the chair includes a collapsible footrest (e.g., 66) at the front between the right and left side chair assemblies, wherein a set of flexible members (e.g., 64) is attached to and extending from the front of the apparatus, such that when the chair and attached apparatus are in the expanded, open position, the flexible members are at the same height and location at a height and location as the collapsible footrest on the chair.

Clause 33. The apparatus of clause 32, wherein the flexible members on the front panel of the apparatus attach or releasably attach to the chair's corresponding collapsible footrest at the front thus securing the apparatus to the footrest of the chair's assembly.

Clause 34. The apparatus of clause 32, wherein when the chair seat scissor frame is pulled upward for chair closure, the apparatus attachment at the collapsible footrest on the front of the chair, creates an upward pull on the center of the base of the apparatus, resulting in the upward and inward folding of front of the base of the apparatus such that it remains completely within the chair's side frame assemblies when the chair is in the fully collapsed position.

Clause 35. The apparatus of any of clauses 32 through 34, wherein the flexible member extensions (e.g., 64) on the front of the apparatus at the height and location of the chair's collapsible footrest, may comprise cord, elastic tape, fabric tape, webbing or a combination thereof; and engage using hook-and-ties, hook-and-loop tape, buckles, zippers, snaps, buttons or clips.

Clause 36. The apparatus of any of clauses 1 through 35, wherein there are one or more horizontal panels (e.g., 68) attached or releasably attached within the interior space of the apparatus.

Clause 37. The apparatus of clause 36, wherein the interior horizontal panel(s) may attach or releasably attach to two or more side panels of the apparatus, extending completely to effectively divide the interior space into completely separate horizontal containment areas (e.g., 70 and 72).

Clause 38. The apparatus of clause 36, wherein the interior horizontal panel(s) might attach or releasably attach to two or more side panels of the apparatus and extend partially into the interior space, thus creating one or more horizontal ledges or loft areas.

Clause 39. The apparatus of any of clauses 36 through 38, wherein interior panel(s) may be composed of various soft materials such as canvas, nylon, mesh, Thinsulate® or other insulated fabrics or soft, foldable plastics, or a combination as best suited for intended use of the apparatus, so as to fold and compress with the apparatus and collapse within the side frames of the chair.

Clause 40. The apparatus of any of clauses 1 through 39, wherein there may be included one or more interior horizontal inserts made of rigid materials (e.g., 74).

Clause 41. The apparatus of clause 40, wherein the interior horizontal inserts may be flat or may have pan sides and can be inserted horizontally through the one or more access openings, to fit within the interior base of the apparatus, or, alternatively, to lay on top of any interior horizontal panels.

Clause 42. The apparatus of any of clauses 40 or 41, wherein the interior horizontal inserts are foldable into a vertical position or entirely removable between uses so as not to impede the chair's closing and the concomitant collapse of the apparatus within the side frames of the chair.

Clause 43. The apparatus of any of clauses 40 through 42, wherein storage for the rigid insert(s) when not in use might be provided on the outside of the apparatus and might incorporate the flexible member extensions at the top left and right sides of the apparatus along with other combinations of straps, sleeves or pockets.

Clause 44. The apparatus of any of clauses 40 through 43, wherein the interior horizontal inserts may be composed of rigid materials to include aluminum, steel, wood or plastic, as best suited for the intended use of the apparatus, but will not be limited to only those listed.

From the foregoing, it will be seen that this subject matter is well adapted to attain all the ends and objects hereinabove set forth together with other advantages which are obvious, inherent, and/or equivalent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. An enclosure usable under a seat of a side-to-side folding chair, the enclosure comprising:
    a plurality of walls enclosing an interior volume, the plurality of walls comprising at least a front portion, back portion, left portion, and right portion, wherein the plurality of walls includes a first removable panel portion and a second removable panel portion that are interchangeable with one another;
    a first flexible extension on the left portion and a second flexible extension on the right portion, the first and second flexible extensions to releasably connect to a respective side frame assembly of the side-to-side folding chair; and
    a releasable connector on the front portion to connect to a pivot point of the side-to-side folding chair.

2. The enclosure of claim 1, wherein the first and second flexible extensions each comprises a lower flexible extension to releasably connect to a bottom rail of the side frame assembly.

3. The enclosure of claim 1, wherein the first and second flexible extension each comprises an upper flexible extension to releasably connect to an arm support of the side frame assembly.

4. The enclosure of claim 1, wherein the first and second flexible extension is each to releasably connect to a vertical support of the side frame assembly.

5. The enclosure of claim 1, wherein the releasable connector is to connect to the center pivot point of a scissor frame.

6. The enclosure of claim 1, wherein the releasable connector is to connect to a pivot point of a foldable foot rest.

7. The enclosure of claim 1, wherein the releasable connector is a first releasable connector to attach to a first fold point, and wherein the enclosure further comprises a second releasable connector on the front portion to connect to a second fold point of the side-to-side folding chair.

8. The enclosure of claim 1 further comprising, a horizontal divider that extends between the left portion and the right portion and that divides the interior volume into a top compartment and a bottom compartment.

9. The enclosure of claim 1, wherein the plurality of walls comprise a mesh panel, and wherein the enclosure further comprises a secondary panel to selectively cover the mesh panel.

10. An enclosure usable under a seat of a side-to-side folding chair, the enclosure comprising:
- a plurality of walls enclosing an interior volume, the plurality of walls comprising at least a front portion, a back portion, a left portion, a right portion, a top portion, and a bottom portion, the top portion for positioning beneath the seat of the side-to-side folding chair;
- a horizontal divider that extends between the left portion and the right portion and that divides the interior volume into a top compartment and a bottom compartment;
- a left upper flexible extension positioned at a first transition between the left portion and the top portion, the first upper flexible extension to releasably connect to a left side frame assembly of the side-to-side folding chair above a first pivot linkage connecting the left side frame assembly to a seat assembly of the side-to-side folding chair; and
- a right upper flexible extension positioned at a second transition between the right portion and the top portion, the right upper flexible extension to releasably connect to a right side frame assembly of the side-to-side folding chair above a second pivot linkage connecting the right side frame assembly to the seat assembly of the side-to-side folding chair.

11. The enclosure of claim 10 further comprising, a releasable connector to attach the front portion to a pivot point of the side-to-side folding chair.

12. A method of enclosing a volume beneath a seat of a side-to-side folding chair, the method comprising:
- positioning an enclosure beneath the seat, the enclosure comprising a plurality of walls enclosing an interior volume, the plurality of walls comprising at least a front portion, back portion, left portion, and right portion;
- attaching a first flexible extension to a first side frame assembly;
- attaching a second flexible extension to a second side frame assembly; and
- attaching the front portion to a pivot point of a foldable footrest of the side-to-side folding chair.

13. The method of claim 12, wherein attaching the first flexible extension comprises attaching the first flexible extension above a first pivot linkage of the side-to-side folding chair, and wherein attaching the second flexible extension comprises attaching the second flexible extension above a second pivot linkage of the side-to-side folding chair.

14. The method of claim 13, wherein attaching the first flexible extension comprises attaching the first flexible extension to a first vertical support, and wherein attaching the second flexible extension comprises attaching the second flexible extension to a second vertical support.

15. The method of claim 13, wherein attaching the first flexible extension comprises attaching the first flexible extension to a first arm support, and wherein attaching the second flexible extension comprises attaching the second flexible extension to a second arm support.

16. The method of claim 12, wherein attaching the first flexible extension comprises attaching the first flexible extension to a first bottom rail, and wherein attaching the second flexible extension comprises attaching the second flexible extension to a second bottom rail.

17. The method of claim 12, wherein attaching the front portion comprises attaching a releasable connector to a center pivot point of a scissor frame.

18. The method of claim 12, wherein the method further comprises attaching a second releasable connector to a center pivot point of a scissor frame.

* * * * *